United States Patent
Nishizawa

(10) Patent No.: US 10,976,836 B2
(45) Date of Patent: Apr. 13, 2021

(54) HEAD-MOUNTED DISPLAY APPARATUS AND METHOD OF CONTROLLING HEAD-MOUNTED DISPLAY APPARATUS

(71) Applicant: SEIKO EPSON CORPORATION, Tokyo (JP)

(72) Inventor: Kazuo Nishizawa, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/254,142

(22) Filed: Jan. 22, 2019

(65) Prior Publication Data
US 2019/0227642 A1 Jul. 25, 2019

(30) Foreign Application Priority Data

Jan. 23, 2018 (JP) .............................. JP2018-008629

(51) Int. Cl.
*G06F 3/0346* (2013.01)
*G06F 3/01* (2006.01)
*G06F 3/041* (2006.01)
*G06F 3/02* (2006.01)

(52) U.S. Cl.
CPC ............ *G06F 3/0346* (2013.01); *G06F 3/011* (2013.01); *G06F 3/013* (2013.01); *G06F 3/041* (2013.01); *G06F 3/02* (2013.01); *G06F 2203/04108* (2013.01)

(58) Field of Classification Search
CPC ........ G06F 3/0346; G06F 3/011; G06F 3/013; G06F 3/041; G06F 3/014; G06F 3/02; G06F 3/015; G06F 2203/04108; G06F 2203/0381
See application file for complete search history.

(56) References Cited

U.S. PATENT DOCUMENTS

| 2009/0219255 A1* | 9/2009 | Woolley ............... G06F 3/0412 345/173 |
| 2010/0009754 A1 | 1/2010 | Shimamura et al. |
| 2013/0050258 A1* | 2/2013 | Liu ........................ G06F 3/005 345/633 |
| 2017/0336882 A1* | 11/2017 | Tome .................... G06F 3/0346 |

FOREIGN PATENT DOCUMENTS

| JP | 2001-251552 A | 9/2001 |
| JP | 2005-258694 A | 9/2005 |
| JP | 2008-015564 A | 1/2008 |
| JP | 2010-017389 A | 1/2010 |

* cited by examiner

*Primary Examiner* — Brent D Castiaux
(74) *Attorney, Agent, or Firm* — Oliff PLC

(57) ABSTRACT

Provided is an HMD including an image display unit to be worn by a user on a head and configured to display an image; a six-axis sensor and a magnetic sensor configured to detect an operation performed by using a control device as a first operation; a touch sensor configured to detect a contact of a finger of the user as a second operation; and a display controller configured to display, on the image display unit, a pointer to be operated by the control device, and to move the pointer based on the motion or attitude of the control device detected by the six-axis sensor and the magnetic sensor. The display controller, upon detecting a contact of a finger of the user by the touch sensor, shifts to an operation state where the display position of the pointer cannot be moved through the operation performed by using the control device.

13 Claims, 20 Drawing Sheets

HEAD-MOUNTED DISPLAY APPARATUS AND METHOD OF CONTROLLING HEAD-MOUNTED DISPLAY APPARATUS

BACKGROUND

1. Technical Field

The invention relates to a head-mounted display apparatus and a method of controlling the head-mounted display apparatus.

2. Related Art

In the related art, there is known an apparatus configured to detect a motion and attitude of an operation device to move a position of an operation image displayed by a display unit in correspondence to the detected motion and attitude of the operation device (for example, see JP-A-2010-017389).

JP-A-2010-017389 discloses a game apparatus configured to set a position and attitude of a moving object within a game space based on angular velocity data transmitted from a first controller, that is, based on an attitude of a gyro sensor unit mounted detachably on the first controller.

Meanwhile, some operation devices include a receiving unit configured to receive an input from a button, a switch, or the like. In a case that a user holds the operation device in his/her hand to perform input to the receiving unit, a change may occur in the position and attitude of the operation device when performing the input to change the position of the operation image. Therefore, in a case of an operation in which the input contents are determined based on the display position of the operation image obtained when the receiving unit receives the input, it may not be possible to input an accurate operation.

SUMMARY

An advantage of some aspects of the invention is to improve the operability of an operation using an operation device.

In order to resolve the above problem, according to an aspect of the invention, a head-mounted display apparatus includes a display unit to be worn by a user on a head and configured to display an image, a detection unit configured to detect a first operation performed by using an operation device, a receiving unit configured to receive a second operation different from the first operation, and a display controller configured to display, on the display unit, an operation image to be operated by the operation device, and to move the operation image, based on the first operation detected by the detection unit. The display controller, upon the receiving unit receiving the second operation, shifts to an operation state where a display position of the operation image cannot be moved by the first operation.

According to the configuration, in the case that the receiving unit receives the second operation, the display position of the operation image does not move even if the first operation is performed. As a result, it is possible to perform an operation on the operation device without changing the display position of the operation image. Therefore, in a case of an operation in which the input contents are determined based on the display position of the operation image obtained when the receiving unit receives the second operation, it is possible to input an accurate operation. As a result, it is possible to improve an operability of an operation performed by using the operation device.

According to the aspect of the invention, in a case that the receiving unit receives a third operation different from the second operation, the display controller changes a correspondence between the first operation and a movement amount of the operation image.

According to the configuration, in the case that the receiving unit receives the third operation, the movement amount of the operation image by the first operation changes. Therefore, the operation image can be easily moved to an intended position by the first operation.

According to the aspect of the invention, the operation device includes a sensor configured to detect at least one of a position, a direction, and a displacement of the operation device, and the detection unit detects an operation for displacing the operation device as the first operation, based on a detection result of the sensor, and acquires a displacement direction and a displacement amount of the operation device as the operation direction and the operation amount of the first operation, and the display controller decides a movement direction and a movement amount of the operation image, based on an acquired displacement direction and displacement amount, and moves the operation image.

According to the configuration, the movement direction and the movement amount of the operation image is decided based on at least one of the position, the direction, and the displacement of the operation device to be detected by the sensor, and the operation image is moved based on the decided movement direction and movement amount. As a result, it is possible to change the display position of the operation image by an operation performed by using the operation device.

According to the aspect of the invention, the operation device includes a sensor configured to detect at least one of a position, a direction, and a displacement of the operation device, and the detection unit detects an operation for displacing the operation device as the first operation, based on a detection result of the sensor, and acquires a direction of the operation device as an operation direction of the first operation, and the display controller determines a movement direction of the operation image, based on the operation direction of the first operation, and moves the operation image in correspondence to a time for which the first operation is maintained.

According to the configuration, the movement direction is decided based on the operation direction of the operation device to be detected by the sensor, and the operation image can be moved in the decided movement direction in correspondence to the time for which the first operation is maintained. As a result, it is possible to change the display position of the operation image by an operation performed by using the operation device.

According to the aspect of the invention, the operation device includes an operation detection unit, and whether the receiving unit has received the second operation is determined based on a detection result of the operation detection unit.

According to the configuration, whether the receiving unit has received the second operation can be determined based on the detection result of the operation detection unit.

According to the aspect of the invention, the operation detection unit is a sensor configured to detect a contact operation.

According to the configuration, upon the sensor detecting a contact operation, it is possible to shift to an operation state where the display position of the operation image cannot be moved by the first operation.

According to the aspect of the invention, the operation detection unit is a sensor configured to detect a proximity operation.

According to the configuration, upon the sensor detecting a proximity operation, it is possible to shift to an operation state where the display position of the operation image cannot be moved by the first operation.

According to the aspect of the invention, the operation device includes a sensor configured to detect at least one of a position, a direction, and a displacement of the operation device, and the receiving unit detects an attitude of the operation device, based on a position and a direction of the operation device to be detected by the sensor, and in a case where it is determined that a detected attitude of the operation device is an attitude corresponding to a pre-set attitude pattern, the receiving unit determines that the second operation has been received.

According to the configuration, the attitude of the operation device is decided based on a position and a direction of the operation device to be detected by the sensor, and in a case that the decided attitude of the operation device corresponds to the attitude pattern, it is determined that the second operation is detected. As a result, when the attitude of the operation device corresponds to the attitude pattern, it is possible to input the second operation to the head-mounted display apparatus.

According to the aspect of the invention, the display unit includes a sight line detection unit configured to detect a sight line of the user, and in a case that a sight line detected by the sight line detection unit is a predetermined direction, the receiving unit changes a correspondence between the first operation and a movement amount of the operation image.

According to the configuration, when the sight line is turned in a predetermined direction, the movement amount of the operation image as a result of the first operation is changed. Therefore, the movement of the operation image to an intended position by the first operation can be easily performed.

According to the aspect of the invention, in a case that the receiving unit receives a fourth operation different from the second operation, the display controller magnifies and displays a portion including the operation image in the image displayed by the display unit.

According to the configuration, by inputting the second operation to the head-mounted display apparatus, it is possible to magnify and display the portion including the operation image in the image displayed by the display unit.

In order to resolve the above problems, according to another aspect of the invention, a method of controlling a head-mounted display apparatus including a display unit to be worn by a user on a head and configured to display an image is provided. The method includes detecting a first operation performed by using an operation device, receiving a second operation different from the first operation, and displaying, on the display unit, an operation image to be operated by the operation device, and moving the operation image, based on the first operation detected by the detection unit, and in a case that the receiving unit receives the second operation, shifting to an operation state where the display position of the operation image cannot be moved by the first operation.

According to the configuration, in the case that the receiving unit receives the second operation, the display position of the operation image does not move even if the first operation is performed. As a result, it is possible to perform an operation on the operation device without changing the display position of the operation image. Therefore, in a case of an operation in which the input contents are determined based on the display position of the operation image obtained when the receiving unit receives the second operation, it is possible to input an accurate operation. As a result, it is possible to improve the operability of the operation performed by using the operation device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
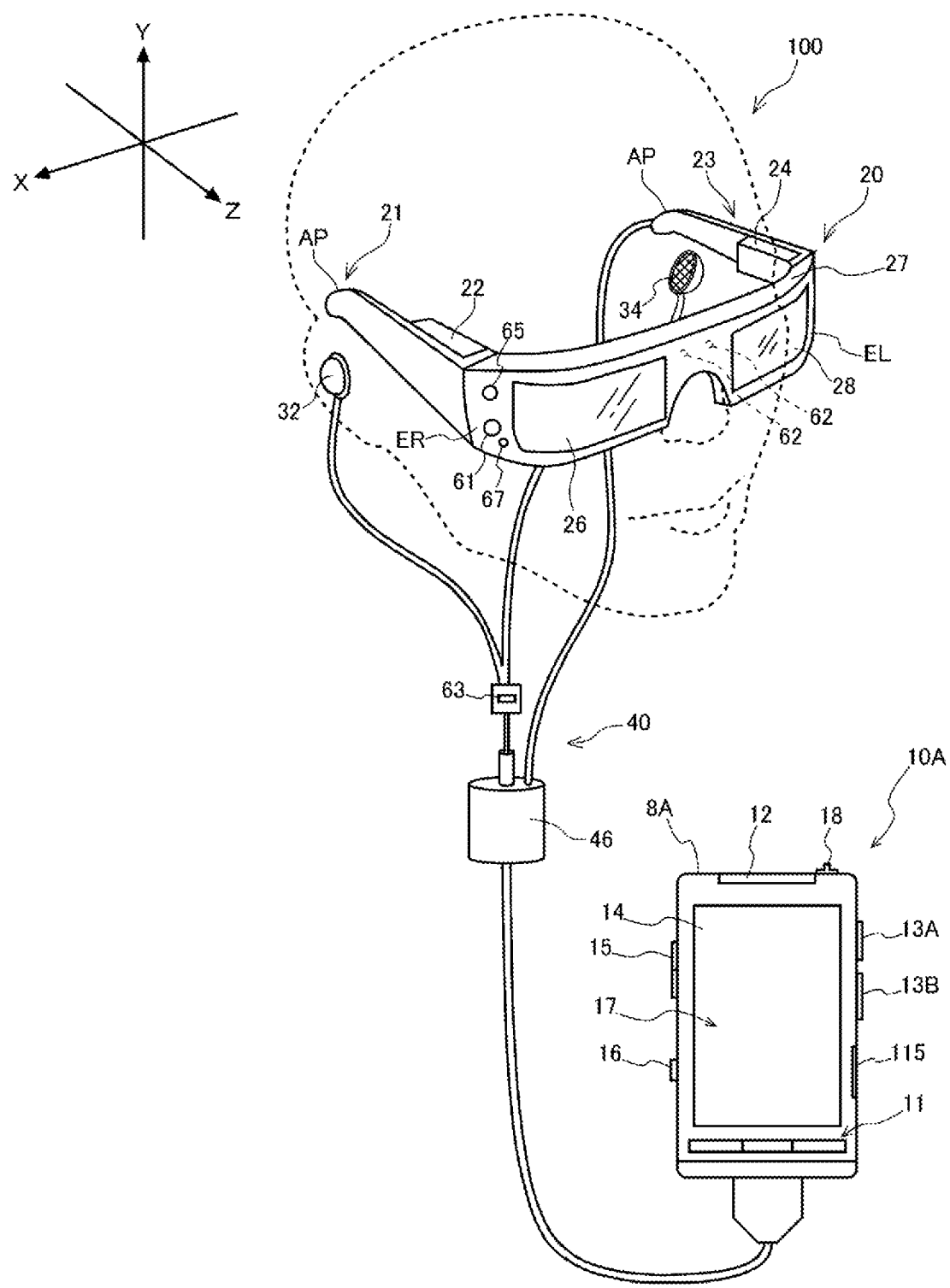
FIG. 1 is an explanatory diagram illustrating an appearance configuration of an HMD.

FIG. 1 is an explanatory diagram illustrating an appearance configuration of a head mounted display (HMD) apparatus 100 according to an exemplary embodiment to which the invention is applied.

The HMD 100 is a display apparatus including an image display unit 20 configured to allow a user wearing it on the head to view a virtual image, and a control device 10A configured to control the image display unit 20. The image display device 20 corresponds to a "display unit" of the invention, and the control device 10A corresponds to an "operation device" of the invention. The control device 10A, as illustrated in FIG. 1, includes a case 8A (also referred to as a housing or a main body) having a flat box shape, and includes components described later in the case 8A. Various types of buttons and switches as well as a track pad 14 configured to receive an operation of the user are provided on the surface of the case 8A. When the user operates the buttons, the switches, or the track pad 14, the control device 10A serves as a controller of the HMD 100.

The image display unit 20 is a head-mounted body with an eyeglass shape worn by the user on the head, and is configured to enable transmission of outside light. The image display unit 20 includes, in a main body including a right holding part 21, a left holding part 23, and a front frame 27, a right display unit 22, a left display unit 24, a right light-guiding plate 26, and a left light-guiding plate 28.

The right holding part 21 and the left holding part 23 extend rearward from respective ends of the front frame 27 to hold the image display unit 20 to the head of the user in a manner similar to the temples of a pair of eyeglasses. One of the ends of the front frame 27 that lies on the right side of the user when s/he wears the image display unit 20 is referred to as an end ER, and the other end that lies on the left side of the user is referred to as an end EL. With the user wearing the image display unit 20, the right holding part 21 extends from the end ER of the front frame 27 to a position corresponding to the right temple of the user. With the user wearing the image display unit 20, the left holding part 23 extends from the end EL to a position corresponding to the left temple of the user.

The right light-guiding plate 26 and the left light-guiding plate 28 are arranged in the front frame 27. With the user wearing the image display unit 20, the right light-guiding plate 26 lies in front of the right eye of the user to allow the user to view an image with the right eye. With the user wearing the image display unit 20, the left light-guiding plate 28 lies in front of the left eye of the user to allow the user to view an image with the left eye.

The front frame 27 has a shape connecting an end of the right light-guiding plate 26 and an end of the left light-guiding plate 28 with each other. With the user wearing the image display unit 20, the position of connection between the right light-guiding plate 26 and the left light-guiding plate 28 lies between the eyebrows of the user. The front frame 27 may be provided with nose pads configured to come into contact with the nose of the user wearing the image display unit 20 at the position of connection between the right light-guiding plate 26 and the left light-guiding plate 28. In this case, the nose pads, the right holding part 21, and the left holding part 23 cooperate to hold the image display unit 20 to the head of the user. A belt (not illustrated) configured to fit to the back of the head of the user wearing the image display unit 20 may be attached to the right holding part 21 and the left holding part 23, and in such a case, the image display unit 20 may be held on to the head of the user by the belt.

The right display unit 22 is a unit for displaying an image by the right light-guiding plate 26, is arranged on the right holding part 21, and lies adjacent to the right temple of the user wearing the image display unit 20. The left display unit 24 is a unit for displaying an image by the left light-guiding plate 28, is arranged on the left holding part 23, and lies adjacent to the left temple of the user wearing the image display unit 20.

The right light-guiding plate 26 and the left light-guiding plate 28 according to the exemplary embodiment are optical parts made of a light transmissive resin or the like, and, for example, are formed of a prism. The right light-guiding plate 26 and the left light-guiding plate 28 guide imaging light output from the right display unit 22 and the left display unit 24 to the eyes of the user.

The image display unit 20 is configured to guide imaging light generated by each of the right display unit 22 and the left display unit 24 to the right light-guiding plate 26 and the left light-guiding plate 28 to use the imaging light to allow the user to view a virtual image. That is, outside light coming from in the front of the user passes through the right light-guiding plate 26 and the left light-guiding plate 28 and enters the eyes of the user.

A camera 61 and an inner camera 62 are arranged in the front frame 27. The camera 61 preferably captures an image in a direction of an external scene viewed by the user wearing the image display unit 20, and is provided on a front face of the front frame 27 at a position so that the camera 61 does not block the outside light passing through the right light-guiding plate 26 and the left light-guiding plate 28. In the example in FIG. 1, the camera 61 is arranged on the end ER of the front frame 27. The camera 61 may be arranged on the end EL or at the connection between the right light-guiding plate 26 and the left light-guiding plate 28.

Further, the inner camera 62 is arranged on the side of the front frame 27 facing the user. A pair of inner cameras 62 are provided in a central position between the right light-guiding plate 26 and the left light-guiding plate 28 so as to correspond respectively to the right eye RE and the left eye LE of the user.

The camera 61 is a digital camera equipped with an imaging lens and an imaging element such as a charge-coupled device (CCD) or a complementary metal oxide semiconductor (CMOS), and while the camera 61 according to the exemplary embodiment is a monocular camera, the camera 61 may be configured of a stereo camera. The camera 61 is configured to capture an image of at least part of an external scene (real space) in a front direction of the HMD 100, i.e., in a direction of the field of view of the user wearing the HMD 100. In other words, it can be said that the camera 61 captures an image of a range overlapping with the field of view of the user or the direction of the field of view of the user, i.e., in a direction of a scene gazed at by the user. While the width of an angle of view of the camera 61 can be appropriately set, in the exemplary embodiment, as described later, the angle of view includes an external field which the user views through the right light-guiding plate 26 and the left light-guiding plate 28. More preferably, the imaging range of the camera 61 is set so that the entire field of view which the user can view through the right light-guiding plate 26 and the left light-guiding plate 28 can be captured. The camera 61 is configured to capture an image in accordance with control by the controller 150 (FIG. 5), and to output imaging data to the imaging controller 153.

Same as the camera 61, the inner camera 62 is a digital camera equipped with an imaging lens and an imaging element such as a CCD and a CMOS. The inner camera 62 is configured to capture an image in an inner direction of the HMD 100, in other words, in a direction facing the user wearing the image display unit 20.

Figure 2:
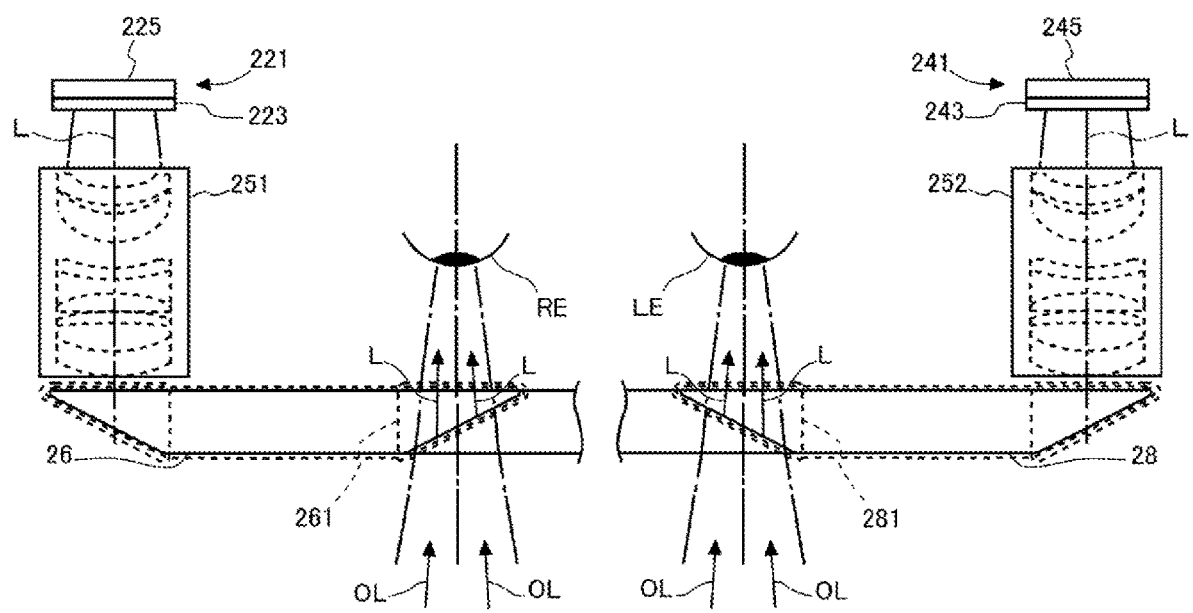
FIG. 2 is a diagram illustrating a configuration of an optical system of an image display unit.

FIG. 2 is a plan view illustrating a main part of a configuration of an optical system included in the image display unit 20. For the purpose of explanation, FIG. 2 illustrates a left eye LE and a right eye RE of the user.

As illustrated in FIG. 2, the right display unit 22 and the left display unit 24 are arranged symmetrically on the right- and left-hand sides. To allow the right eye RE of the user to view an image, the right display unit 22 includes an organic light-emitting diode (OLED) unit 221 configured to emit imaging light, and a right optical system 251 including a lens group and the like configured to guide the imaging light L emitted by the OLED unit 221. The imaging light L is guided to the right light-guiding plate 26 by the right optical system 251.

The OLED unit 221 includes an OLED panel 223 and an OLED drive circuit 225 configured to drive the OLED panel 223. The OLED panel 223 is a self-emitting display panel including, in a matrix, light-emitting elements configured to emit red (R) color light, green (G) color light, and blue (B) color light, respectively, by organic electro-luminescence. The OLED panel 223 includes a plurality of pixels, each including an R element, a G element, and a B element, and forms an image by pixels arranged in a matrix. The OLED drive circuit 225 is controlled by the controller 150 (FIG. 5) to select and power the light-emitting elements included in the OLED panel 223 to cause the light-emitting elements of the OLED panel 223 to emit light. The OLED drive circuit 225 is secured by bonding or the like onto a rear face of the OLED panel 223, i.e., back of a light-emitting surface. The OLED drive circuit 225 may include a semiconductor device configured to drive the OLED panel 223, for example, and may be mounted onto a substrate (not illustrated) secured to the rear face of the OLED panel 223.

The OLED panel 223 may be configured to include light-emitting elements to emit white color light arranged in a matrix and color filters corresponding to the R color, the G color, and the B color, respectively, disposed over the light-emitting elements. The OLED panel 223 with a WRGB configuration may be employed, which includes light-emitting elements configured to emit white (W) color light, in addition to light-emitting elements configured to emit R color light, G color light, and B color light, respectively.

The right optical system 251 includes a collimate lens configured to collimate the imaging light L emitted from the OLED panel 223. The imaging light L collimated by the collimate lens enters the right light-guiding plate 26. An optical path configured to guide light in the right light-guiding plate 26 is formed with a plurality of reflective faces configured to reflect the imaging light L. The imaging light L reflected multiple times within the right light-guiding plate 26 is guided to the right eye RE. The right light-guiding plate 26 is formed with a half mirror 261 (reflective face) in front of the right eye RE. The imaging light L reflected by the half mirror 261 is emitted from the right light-guiding plate 26 to the right eye RE, and forms an image on the retina of the right eye RE, thus allowing the user to view the image.

Further, to allow the left eye LE of the user to view an image, the left display unit 24 includes an OLED unit 241 configured to emit imaging light, and a left optical system 252 including a lens group and the like configured to guide the imaging light L emitted by the OLED unit 241. The imaging light L is guided to the left light-guiding plate 28 by the left optical system 252.

The OLED unit 241 includes an OLED panel 243, and an OLED drive circuit 245 configured to drive the OLED panel 243. The OLED panel 243 is a self-emitting display panel configured in the same way as the OLED panel 223. The OLED drive circuit 245 is controlled by the controller 150 to select and power the light-emitting elements included in the OLED panel 243 to cause the light-emitting elements of the OLED panel 243 to emit light. The OLED drive circuit 245 is secured by bonding or the like onto a rear face of the OLED panel 243, that is, back of a light-emitting surface. The OLED drive circuit 245 may include a semiconductor device configured to drive the OLED panel 243, for example, and may be mounted onto a substrate (not illustrated) secured to the rear face of the OLED panel 243.

The left optical system 252 includes a collimate lens configured to collimate the imaging light L emitted from the OLED panel 243. The imaging light L collimated by the collimate lens enters the left light-guiding plate 28. The left light-guiding plate 28 is an optical element formed with a plurality of reflective faces configured to reflect the imaging light L, and is, for example, a prism. The imaging light L reflected multiple times within the left light-guiding plate 28 is guided to the left eye LE. The left light-guiding plate 28 is formed with a half mirror 281 (reflective face) in front of the left eye LE. The imaging light L reflected by the half mirror 281 is emitted from the left light-guiding plate 28 to the left eye LE, and forms an image on the retina of the left eye LE, thus allowing the user to view the image.

According to the configuration, the HMD 100 serves as a see-through type display apparatus. That is, the imaging light L reflected by the half mirror 261 and the outside light OL passing through the right light-guiding plate 26 enter the right eye RE of the user. The imaging light L reflected by the half mirror 281 and the outside light OL passing through the half mirror 281 also enter the left eye LE. As described above, the HMD 100 allows the imaging light L of the image processed internally and the outside light OL to enter the eyes of the user in an overlapped manner, and the user can see the external view through the right light-guiding plate 26 and the left light-guiding plate 28, and can view the image based on the imaging light L overlapping with the external scene.

The half mirrors 261 and 281 are image extracting units configured to reflect the imaging light output by the right display unit 22 and the left display unit 24 respectively to extract images, and can be referred to as a display unit.

Note that configurations of the left optical system 252 and the left light-guiding plate 28, as well as the right optical system 251 and the right light-guiding plate 26 are not limited to the above example. Any desired configuration may be adopted as long as imaging light forms a virtual image in front of the eyes of the user, for example, diffraction grating may be employed, or a semi-transmissive reflective film may be employed.

Coming back to FIG. 1, the control device 10A and the image display unit 20 are coupled via a coupling cable 40. The coupling cable 40 is detachably coupled to a connector (not illustrated) provided at a lower part of the case 8A, and is also coupled from a tip of the left holding part 23 to various circuits within the image display unit 20. The coupling cable 40 may include a metal cable or an optical fiber cable configured to transmit digital data, or may include a metal cable configured to transmit analog signals. A connector 46 is provided at a mid-point of the coupling cable 40. The connector 46 is a jack used to couple a stereo mini-plug. The connector 46 and the control device 10A are coupled to each other with a line configured to transmit analog sound signals, for example. In the configuration example illustrated in FIG. 1, the connector 46 is coupled to a headset 30 including a microphone 63, and to a right ear piece 32 and a left ear piece 34 that form a stereo headphone.

Figure 4:
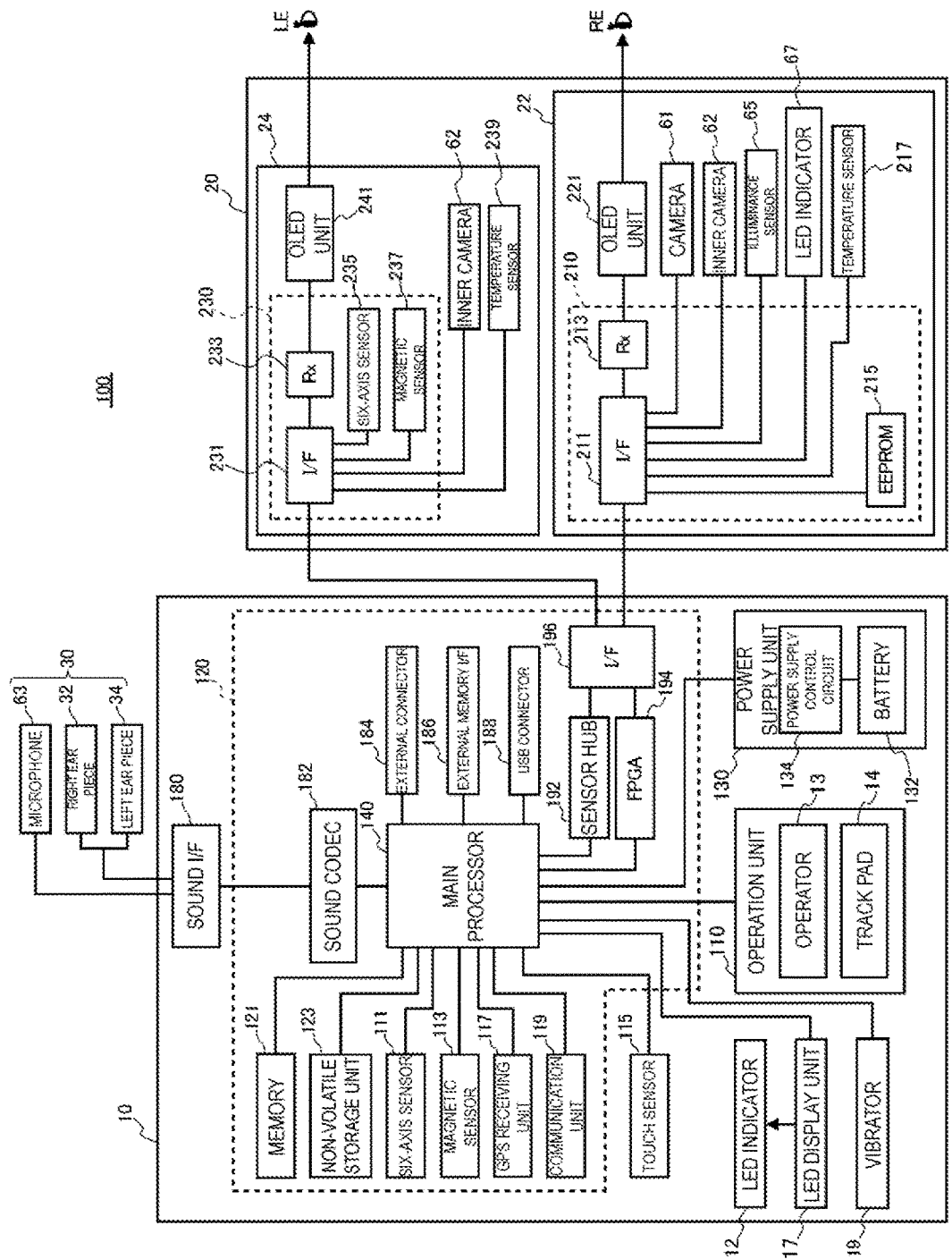
FIG. 4 is a block diagram of components included in the HMD.

As illustrated in FIG. 1, for example, the microphone 63 is positioned with a sound collector of the microphone 63 facing in a sight line direction of the user, and is configured to collect sound and output sound signals to a sound interface 180 (FIG. 4). The microphone 63 may be, for example, a monaural microphone or a stereo microphone, or may be a directional microphone or a non-directional microphone.

The control device 10A includes operation buttons 11, an LED indicator 12, a movement change button 13A, a determination button 13B, and a touch sensor 115 as an operated component to be operated by the user. In addition, the control device 10A includes a track pad 14, an up/down key 15, a selector switch 16, and a power switch 18 as an operated component. The operated units described above are arranged on a surface of the case 8A. The touch sensor 115 operates as an "operation detection unit" of the invention.

The operation buttons 11 include a menu key, a home key, a return key, and the like for operating the operating system (hereinafter, abbreviated as OS) 143 (FIG. 5) on which the control device 10A executes, and particularly, among the keys and switches described above, include those to be displaced as a result of a pressing operation. The LED indicator 12 either lights up or flashes in correspondence to the operating state of the HMD 100. The movement change button 13A is a button configured to change the movement system of the pointer 330 being an "operation image". The determination button 13B is a button for confirming an operation. The touch sensor 115 is a sensor configured to detect a contact of an object by a finger or the like of the user, and detects the contact operation of the finger as a second operation. The up/down key 15 is utilized to input an instruction to increase or decrease the sound volume output from the right ear piece 32 and the left ear piece 34, and to input an instruction to increase or decrease the brightness of the display of the image display unit 20. The selector switch 16 is a switch configured to select an input corresponding to an operation of the up/down key 15. The power switch 18 is a switch configured to select power on/off for the HMD 100, and is configured of a slide switch, for example. In FIG. 1, an example in which the operation buttons 11, the movement change button 13A, and the determination button 13B are provided as hardware buttons is illustrated, however, the operation buttons 11, the movement change button 13A, and the determination button 13B displayed by the image display unit 20 as software buttons may be operated by operating a cursor from a touch panel or a touch pad.

The track pad 14 has an operation surface configured to detect a contact operation, and outputs an operation signal in response to an operation on the operation surface. The detection method on the operation surface is not limited, and can be an electrostatic method, a pressure detection method, an optical method, or the like. A contact (touch operation) on the track pad 14 is, for example, detected by a touch sensor (not illustrated). The track pad 14 is configured to output, to the controller 150, a signal indicating a position of the operation surface where the contact is detected.

Figure 3:
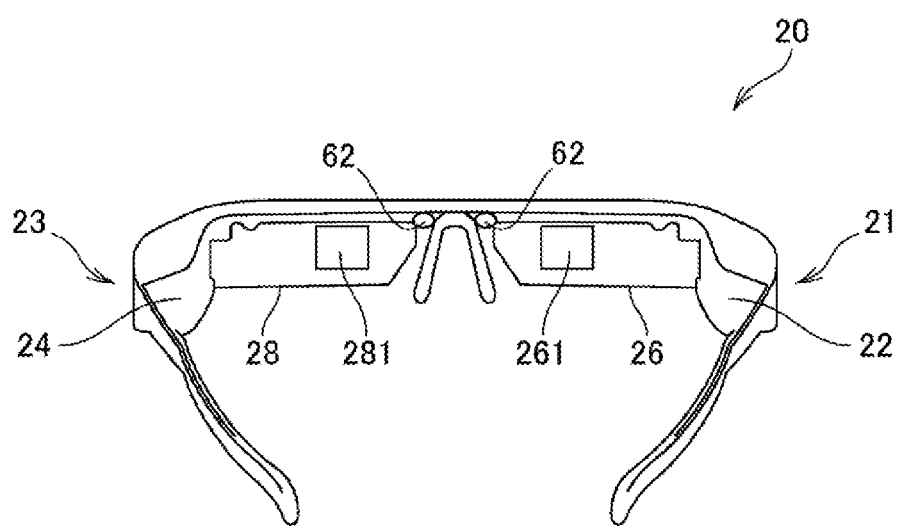
FIG. 3 is a perspective view of a main part of the image display unit seen from a head side of a user.

FIG. 3 is a diagram illustrating a configuration of a main part of the image display unit 20. FIG. 3 is a perspective view of the main part of the image display unit 20 seen from a head side of the user. In other words, the rear side of the right light-guiding plate 26 and the left light-guiding plate 28 are seen.

In FIG. 3, the half mirror 261 configured to irradiate imaging light on the right eye RE of the user, and the half mirror 281 configured to irradiate imaging light on the left eye LE are visible as approximately square-shaped regions. Further, the entire area of the right light-guiding plate 26 and the left light-guiding plate 28 including the half mirrors 261 and 281 transmit the outside light as described above.

Therefore, the user views an external scene through the entire area of the right light-guiding plate 26 and the left light-guiding plate 28, while viewing rectangular display images at the positions of the half mirrors 261 and 281.

The camera 61 captures a range including an external scene viewable together with the image displayed by the image display unit 20. The camera 61 is arranged at an end on the right-hand side of the image display unit 20 to capture an image in the sight line direction of both eyes of the user, that is, in front of the user. The optical axis of the camera 61 extends in a direction including sight line directions of the right eye RE and the left eye LE. The external scene viewable by the user wearing the HMD 100 is not necessarily an infinitely distant scene. For example, in a case where the user views an object located in front of the user with both eyes, the distance from the user to the object often ranges around 30 cm to 10 m, both inclusive, and more often ranges from 1 m to 4 m, both inclusive. Based upon this, standard maximum and minimum distances from the user to the object during normal use of HMD 100 may be specified. The standard values may be determined through investigations or experiments, or may be set by the user. It is preferred that the optical axis and the angle of view of the camera 61 be set such that the object is included within the angle of view when the distance to the object during normal use corresponds to the set standards of the maximum and minimum distances.

Generally, the visual field angle of humans is around 200 degrees in the horizontal direction, and around 125 degrees in the vertical direction, and within these angles, an effective visual field advantageous for information acceptance performance is 30 degrees in the horizontal direction and 20 degrees in the vertical direction. In general, a stable field of fixation in which a human can promptly and stably view any point of fixation ranges from approximately 60 degrees to 90 degrees, both inclusive, in the horizontal direction and from approximately 45 degrees to 70 degrees, both inclusive, in the vertical direction. When the point of fixation is an object located in front of the user, around 30 degrees in the horizontal direction, and around 20 degrees in the vertical direction are the effective visual fields with the sight line of the right eye RE and the left eye LE, respectively, as the center, in the visual field of the user. Further, the stable visual field of fixation ranges from approximately 60 degrees to 90 degrees, both inclusive, in the horizontal direction and from approximately 45 degrees to 70 degrees, both inclusive, in the vertical direction, and the visual field angle is approximately 200 degrees in the horizontal direction, and approximately 125 degrees in the vertical direction. The visual field of the user actually viewing an object through the right light-guiding plate 26 and the left light-guiding plate 28 can be referred to as an actual visual field (FOV). In the configuration of the exemplary embodiment illustrated in FIG. 1 and FIG. 2, the actual visual field corresponds to the actual visual field for the user to view an object through the right light-guiding plate 26 and the left light-guiding plate 28. The actual visual field is narrower than the visual field angle and the stable field of fixation, but wider than the effective visual field.

It is preferable that the angle of view of the camera 61 enables capturing images in a range wider than the visual field of the user, and specifically, it is preferable that the angle of view is at least wider than the effective visual field of the user. It is more preferable that the angle of view is wider than the actual visual field of the user. It is further preferable that the angle of view is wider than the stable field of fixation of the user, and it is most preferable that the angle of view is wider than the visual field angle of both eyes of the user.

The camera 61 may be equipped with a so-called wide-angle lens as an imaging lens, and may be configured to capture a wider angle of view. The wide-angle lens may include lenses called a super wide-angle lens or a semi wide-angle lens, or the wide-angle lens may be a single-focus lens or a zoom lens, or the camera 61 may be configured to have a lens group including a plurality of lenses.

The inner camera 62 includes an inner camera for capturing an image of the right eye of the user, and an inner camera for capturing an image of the left eye of the user. The width of the angle of view of the inner camera 62 can be appropriately set to be same as the camera 61. However, the width of the angle of view of the inner camera 62 is preferably set within a range in which an image of the entire right eye or the entire left eye of the user can be captured. Same as the camera 61, the inner camera 62 is configured to capture an image in accordance with a control by the controller 150, and to output the captured data thus obtained to the controller 150. The inner camera 62 works together with the controller 150 to serve as a "sight line detection unit". For example, the controller 150 detects an image of the reflected light and the pupil on the surface of the eyeball of the right eye RE and the left eye LE from the imaging data of the inner camera 62, and determines the sight line direction of the user.

Further, the method of detecting the sight line is not limited to the method of detecting an image of the reflected light and the pupil from the imaging data of the inner camera 62, and then determining the sight line direction of the user. For example, the sight line direction of the user may be detected by detecting an electromyogram of the eye, or by allowing infrared light to enter the eye of the user together with the imaging light, or the like, capturing the resultant reflected light with an infrared camera, and then performing image processing of the captured imaging data.

FIG. 4 is a block diagram illustrating a configuration of components included in the HMD 100.

The control device 10A includes a main processor 140 configured to execute a program to control the HMD 100. The main processor 140 is coupled with a memory 121 and a non-volatile storage unit 123. The main processor 140 is also coupled with sensors including a six-axis sensor 111, a magnetic sensor 113, and a touch sensor 115. The main processor 140 is also coupled with a GPS receiving unit 117, a communication unit 119, a sound codec 182, and an external connector 184. In addition, the main processor 140 is coupled with an external memory interface 186, a Universal Serial Bus (USB) connector 188, a sensor hub 192, and an FPGA 194. The components function as an interface to external devices. The main processor 140 is also coupled with an LED display unit 17, a vibrator 19, an operation unit 110, and a power supply unit 130.

The main processor 140 is mounted on a controller substrate 120 built into the control device 10A. In addition to the main processor 140, the memory 121, the non-volatile storage unit 123, the six-axis sensor 111, the magnetic sensor 113, the GPS receiving unit 117, the communication unit 119, the sound codec 182, and the like are further mounted on the controller substrate 120. Further, in the exemplary embodiment, the external connector 184, the external memory interface 186, the USB connector 188, the sensor hub 192, the FPGA 194, and the interface (I/F) 196 are mounted on the controller substrate 120.

The memory 121, in a case that the main processor 140 executes a control program, configures work area used to temporarily store the control program to be executed and data to be processed. The non-volatile storage unit 123 includes a flash memory and an embedded Multi Media Card (eMMC). The non-volatile storage unit 123 is configured to store programs to be executed by the main processor 140, and various types of data to be processed after executing a program by the main processor 140.

FIG. 4 illustrates a configuration in which the functions of the control device 10A are achieved by a single main processor 140, however, the functions of the control device 10A may be achieved by a plurality of processors or semiconductor chips. For example, a co-processor such as a System-on-a-Chip (SoC), a Micro Control Unit (MCU), and a Field-Programmable gate Array (FPGA) may be further mounted on the controller substrate 120. Moreover, the control device 10A may either operate together with both the main processor 140 and the co-processor, or selectively use either one of the both to perform various types of controls.

The six-axis sensor 111 is a motion sensor (inertial sensor) including a three-axis acceleration sensor and a three-axis gyro (angular velocity) sensor. The six-axis sensor 111 may include an inertial measurement unit (IMU) in which the sensors are provided as modules. The magnetic sensor 113 is a three-axis geomagnetic sensor, for example. The six-axis sensor 111 and the magnetic sensor 113 operate as a "detection unit" and a "sensor" configured to detect an operation performed by using the operation device.

The six-axis sensor 111 and the magnetic sensor 113 are configured to output detected values to the main processor 140 in accordance with a predetermined sampling frequency. Further, the six-axis sensor 111 and the magnetic sensor 113 output detected values to the main processor 140 at a timing specified by the main processor 140, in response to a request of the main processor 140.

The GPS receiving unit 117 includes a GPS antenna not illustrated, and is configured to receive GPS signals transmitted from a GPS satellite. The GPS receiving unit 117 is configured to output the received GPS signals to the main processor 140. Further, the GPS receiving unit 117 measures the signal strength of the received GPS signals, and outputs the measured value to the main processor 140. The signal strength may be information such as Received Signal Strength Indication (RSSI), electrical field strength, magnetic field strength, Signal to Noise ratio (SNR), or the like.

The communication unit 119 executes wireless communication with external devices. The communication unit 119 includes an antenna, an RF (radio frequency) circuit, a baseband circuit, a communication control circuit, and the like, or is configured as a device with the above-described components integrated with each other. The communication unit 119 is configured to perform wireless communications conforming to standards of wireless LAN, such as Bluetooth (trade name), and wireless LAN (including Wi-Fi (trade name)), for example.

The sound interface 180 is an interface configured to receive and output sound signals. In the exemplary embodiment, the sound interface 180 includes a connector 46 (FIG. 1) provided in the coupling cable 40. The connector 46 is coupled to the headset 30. The sound signals output by the sound interface 180 are input to the right ear piece 32 and the left ear piece 34, and as a result, the right ear piece 32 and the left ear piece 34 output sound. Further, the microphone 63 included in the headset 30 is configured to collect sound and output a sound signal to the sound interface 180. The sound signals input to the sound interface 180 from the microphone 63 are input to the external connector 184.

The sound codec 182 is coupled to the sound interface 180 and is configured to encode and decode sound signals input and output via the sound interface 180. The sound codec 182 may include an analog/digital (A/D) converter configured to convert an analog sound signal into digital sound data and a digital/analog (D/A) converter configured to perform the opposite conversion. For example, the HMD 100 according to the exemplary embodiment outputs sounds from the right ear piece 32 and the left ear piece 34, and collects sounds from the microphone 63. The sound codec 182 converts digital sound data output from the main processor 140 into an analog sound signal and outputs the analog sound signal via the sound interface 180. The sound codec 182 converts an analog sound signal input into the sound interface 180 into digital sound data, and outputs the digital sound data to the main processor 140.

The external connector 184 is a connector configured to couple the external apparatus to perform communications with the main processor 140. The external connector 184, for example, couples the external apparatus to the main processor 140, and is an interface for coupling the external apparatus when debugging of the program executed by the main processor 140, and collection of the log of operations of the HMD 100 are performed.

The external memory interface 186 is an interface capable of coupling portable memory devices, and includes, for example, an interface circuit and a memory card slot capable of accepting a card-type recording medium for reading data, for example. In such a case, the size, shape, and standard of the card-type recording medium are not limited, and can be appropriately changed.

The USB connector 188 includes a connector conforming to the USB standard, and an interface circuit. The USB connector 188 can couple USB memory devices, smartphones, computers, or the like. The size and shape of the USB connector 188, as well as the compatible version of the USB standard for the USB connector 188 can be appropriately selected or changed.

The sensor hub 192 and the FPGA 194 are coupled to the image display unit 20 via the interface 196. The sensor hub 192 is configured to acquire detected values of various sensors included in the image display unit 20, and output the detected values to the main processor 140. Further, the FPGA 194 is configured to process data to be transmitted and received between the main processor 140 and components of the image display unit 20, as well as to transmit data via the interface 196.

The touch sensor 115 is, for example, provided on the side of the case 8A, and is configured to detect a contact (touch) on the side by a finger of the user when the determination button 13B provided similarly on the side is operated.

The LED indicator 12 either lights up or flashes in correspondence to the operating state of the HMD 100. The LED display unit 17 is configured to control the on/off action of the LED indicator 12 in accordance with the control by the main processor 140. The LED display unit 17 may include the LED (not illustrated) arranged immediately below the track pad 14, and a drive circuit for turning on the LED. In such a case, the LED display unit 17 causes the LED to turn on, flash, or turn off in accordance with the control by the main processor 140.

The vibrator 19 includes a motor and an eccentric rotor (both not illustrated), and may have another necessary configuration. The vibrator 19 generates vibrations by rotating the motor in accordance with control by the main processor 140. The HMD 100 causes the vibrator 19 to vibrate in a predetermined vibration pattern when an operation to the operation unit 110 is detected, or when a power supply to the HMD 100 is turned on or off or in the other cases.

The operation unit 110 includes an operator 13 and a track pad 14. The operator 13 is a general term for buttons and key switches, and examples of the operator 13 include an operation button 11, the movement change button 13A, the determination button 13B, the up/down key 15, the selector switch 16, and the power supply switch 18. In a case that the operator 13 and the track pad 14 receive an operation, the operation unit 110 is configured to output, to the controller 150, an operation signal including identification information of the operator 13 and the track pad 14 that have received the operation, and information indicating the received operation contents.

The control device 10A includes a power supply unit 130, and operates by the power supplied from the power supply unit 130. The power supply unit 130 includes a rechargeable battery 132, and a power supply control circuit 134 configured to detect a remaining amount of the battery 132, and control the charging of the battery 132. The power supply control circuit 134 is coupled to the main processor 140, and is configured to output, to the main processor 140, the detected value of the remaining amount of the battery 132, or the detected value of a voltage. Further, the power supply control circuit 134 may, based on the power supplied by the power supply unit 130, supply power to the image display unit 20 from the control device 10A. Further, the main processor 140 may be configured to control the state of power supply from the power supply unit 130 to components of the control device 10A and the image display unit 20.

The right display unit 22 and the left display unit 24 of the image display unit 20 are each coupled to the control device 10A. As illustrated in FIG. 1, in the HMD 100, the coupling cable 40 is coupled to the left holding part 23. A wire coupled to the coupling cable 40 is arranged in the image display unit 20 to couple the right display unit 22 and the left display unit 24 to the control device 10A.

The right display unit 22 has a display unit substrate 210. The display unit substrate 210 is mounted with an interface (I/F) 211 coupled to the interface 196, a receiving unit (Rx) 213 configured to receive data input from the control device 10A via the interface 211, and an EEPROM 215.

The interface 211 couples the receiving unit 213, the EEPROM 215, the temperature sensor 217, the camera 61, the inner camera 62, the illuminance sensor 65, and the LED indicator 67 to the control device 10A.

The electrically erasable programmable read-only memory (EEPROM) 215 stores various types of data so as to be readable by the main processor 140. The EEPROM 215 stores data about a light-emitting property and a display property of the OLED units 221 and 241 included in the image display unit 20, and data about the properties of the sensor included in the right display unit 22 or the left display unit 24, for example. Specifically, the EEPROM 215 stores parameters regarding Gamma correction performed by the OLED units 221 and 241, and data used to compensate for the detected values of the temperature sensors 217 and 239. The data is generated when the HMD 100 is inspected upon shipping from a factory, and is written to the EEPROM 215, and after shipment, the main processor 140 can use the data of the EEPROM 215 to perform the processing.

The camera 61 and the inner camera 62 are configured to capture images in accordance with a signal entered via the interface 211, and output imaging data or a signal indicative of the result of imaging to the control device 10A.

As illustrated in FIG. 1, the illuminance sensor 65 is arranged on the end ER of the front frame 27 and is configured to receive outside light coming from in front of the user wearing the image display unit 20. The illuminance sensor 65 is configured to output a detected value corresponding to the amount of received light (intensity of received light).

As illustrated in FIG. 1, the LED indicator 67 is arranged adjacent to the camera 61 on the end ER of the front frame 27. The LED indicator 67 is configured to turn on while the camera 61 is capturing images to notify that the capturing is in progress.

The temperature sensor 217 is configured to detect a temperature and output a voltage value or a resistance value corresponding to the detected temperature as a detected value. The temperature sensor 217 is mounted on the rear face of the OLED panel 223 (FIG. 2). The temperature sensor 217 may be mounted on the same substrate as the OLED drive circuit 225, for example. With this configuration, the temperature sensor 217 mainly detects the temperature of the OLED panel 223.

The receiving unit 213 is configured to receive data transmitted by the main processor 140 via the interface 211. The receiving unit 213, upon receiving image data of an image to be displayed on the OLED unit 221, outputs the received image data to the OLED drive circuit 225 (FIG. 2).

The left display unit 24 has a display unit substrate 230. The display unit substrate 230 is mounted with an interface (I/F) 231 coupled to the interface 196, and a receiving unit (Rx) 233 configured to receive data input from the control device 10A via the interface 231. Further, the display unit substrate 210 is mounted with a six-axis sensor 235 and a magnetic sensor 237. The interface 231 couples the receiving unit 233, the six-axis sensor 235, the magnetic sensor 237, the inner camera 62, and the temperature sensor 239 to the control device 10A.

The six-axis sensor 235 is a motion sensor (inertial sensor) including a three-axis acceleration sensor and a three-axis gyro (angular velocity) sensor. The six-axis sensor 235 may be an IMU in which the above-described sensors are provided as modules. The magnetic sensor 237 is a three-axis geomagnetic sensor, for example.

The inner camera 62 is configured to capture an image in accordance with a signal entered via the interface 231, and output imaging data or a signal indicative of the result of imaging to the control device 10A.

The temperature sensor 239 is configured to detect a temperature and output a voltage value or a resistance value corresponding to the detected temperature as a detected value. The temperature sensor 239 is mounted on the rear face of the OLED panel 243 (FIG. 2). The temperature sensor 239 and the OLED drive circuit 245 may be mounted on a single substrate, for example. With this configuration, the temperature sensor 239 mainly detects a temperature of the OLED panel 243. Further, the temperature sensor 239 may be built into the OLED panel 243 or the OLED drive circuit 245. Moreover, the substrate may be a semiconductor substrate. Specifically, in a case where the OLED panel 243 is mounted as an Si-OLED together with the OLED drive circuit 245 and the like to form an integrated circuit on an integrated semiconductor chip, the temperature sensor 239 may be mounted on the semiconductor chip.

The camera 61, the inner camera 62, the illuminance sensor 65, and the temperature sensor 217 included in the right display unit 22, as well as the six-axis sensor 235, the magnetic sensor 237, the inner camera 62, and the temperature sensor 239 included in the left display unit 24 are coupled to the sensor hub 192.

The sensor hub 192 is configured to be controlled by the main processor 140 to set and initialize sampling periods of the sensors. Based on the sampling periods of the sensors, the sensor hub 192 supplies power to the sensors, transmits control data, and acquires detected values, for example. At a pre-set timing, the sensor hub 192 outputs detected values of the sensors included in the right display unit 22 and the left display unit 24 to the main processor 140. The sensor hub 192 may include a function for temporarily holding the detected values of the sensors in accordance with the timing of output to the main processor 140. Further, the sensor hub 192 may have a function for corresponding differences in signal formats or data formats of the output values from the sensors to convert the output values to data in a unified data format to output the data to the main processor 140. The sensor hub 192 is also controlled by the main processor 140 to start and stop supplying power to the LED indicator 67 to turn on or off the LED indicator 67 in accordance with the timing when the camera 61 starts and ends capturing images.

Figure 5:
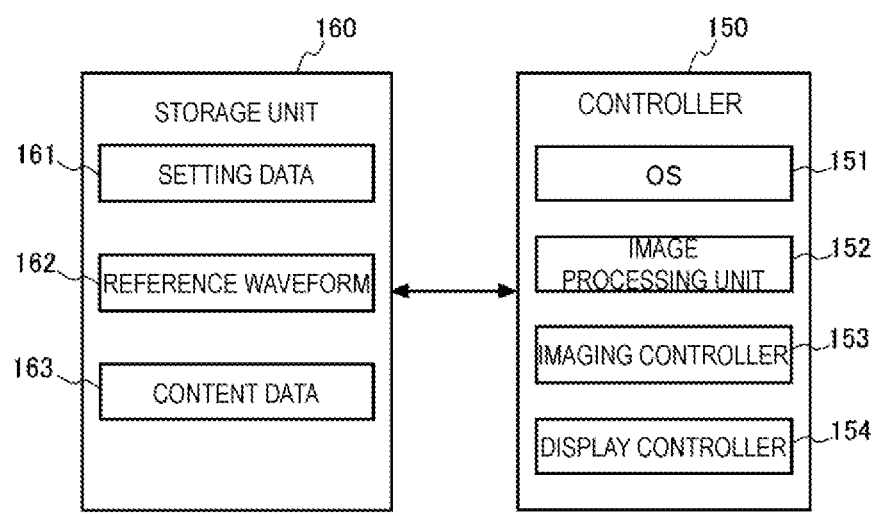
FIG. 5 is a block diagram of a controller and a storage unit.

FIG. 5 is a functional block diagram of a storage unit 160 and the controller 150 included in the control system of the control device 10A. The storage unit 160 illustrated in FIG. 5 is a logical storage unit configured based on the non-volatile storage unit 123 (FIG. 4), and may include the EEPROM 215. Further, the controller 150, and the various types of functional components included in the controller 150 are formed when the main processor 140 executes a program to collaboratively operate the software and the hardware. The controller 150 and the functional components included in the controller 150 include for example, the main processor 140, the memory 121, and the non-volatile storage unit 123.

The controller 150 utilizes the data stored in the storage unit 160 to execute various processes to control the HMD 100. The storage unit 160 stores various types of data processed by the controller 150. The storage unit 160 stores setting data 161, a reference waveform 162, and content data 163. The setting data 161 includes various set values for operations of the HMD 100. Further, in a case where the controller 150 uses parameters, determinants, computing equations, LookUp Tables (LUTs), and the like when controlling the HMD 100, the parameters, the determinants, the computing equations, the LookUp Tables (LUTs), and the like may be included in the setting data 161.

The setting data 161 includes the setting of a first angle $\theta 1$ and a second angle $\theta 2$.

The first angle $\theta 1$ is a difference between the angle of the control device 10A when the position indicated by the control device 10A is at the left end of the display area VR, and the angle of the control device 10A when the position indicated by the control device 10A is at the right end of the display area VR.

The second angle $\theta 2$ is a difference between the angle of the control device 10A when the position indicated by the control device 10A is at the upper end of the display area VR, and the angle of the control device 10A when the position indicated by the control device 10A is at the lower end of the display area VR.

It is also possible to set the horizontal angle of view of the HMD 100 as the first angle $\theta 1$, and the vertical angle of view of the HMD 100 as the second angle $\theta 2$, beforehand.

Figure 6:
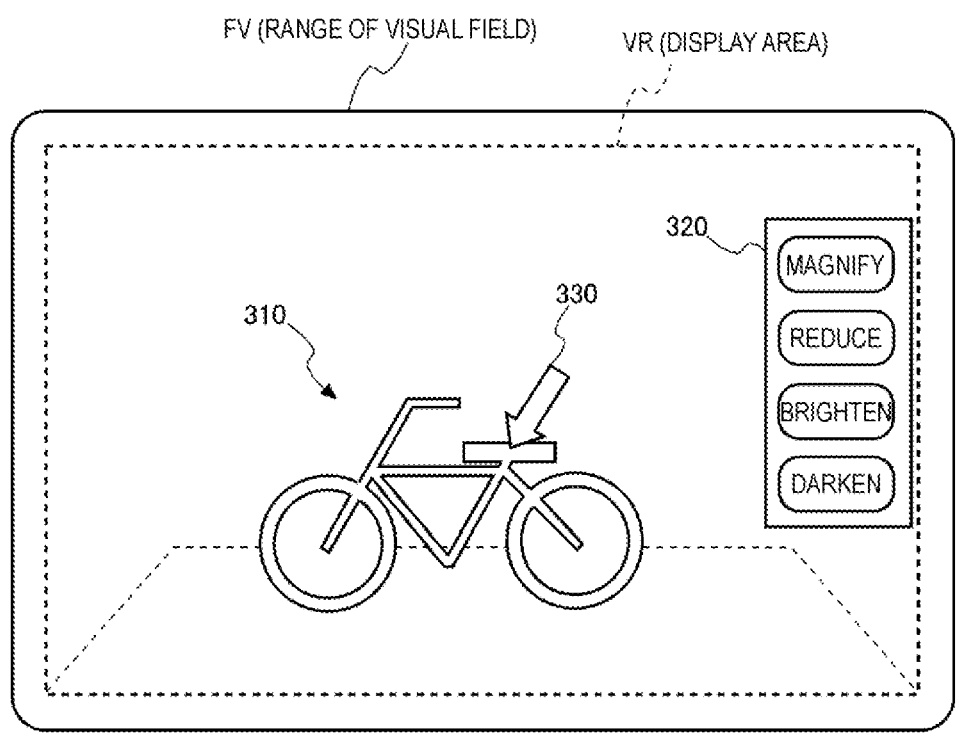
FIG. 6 is a diagram illustrating a display area.

FIG. 6 is a diagram illustrating the display area VR.

The display area VR will be described now. The display area VR is an area in which the image display unit 20 can display images within the range of the visual field (FV) of the user wearing the image display unit 20 on the head. The display area VR is superimposed on the exterior scene, and the user can simultaneously view the object displayed by the image display unit 20 and the exterior scene. In the display area VR illustrated in FIG. 6, an image 310 of a bicycle, icons 320, and a pointer 330 are displayed as an example of images displayed by the image display unit 20. The pointer 330 corresponds to an "operation image to be operated" in the invention. FIG. 6 illustrates an arrow-shaped pointer 330, but the shape (for example, a round shape), size, color, and the like of the pointer 330 are optionally changeable.

Figure 7:
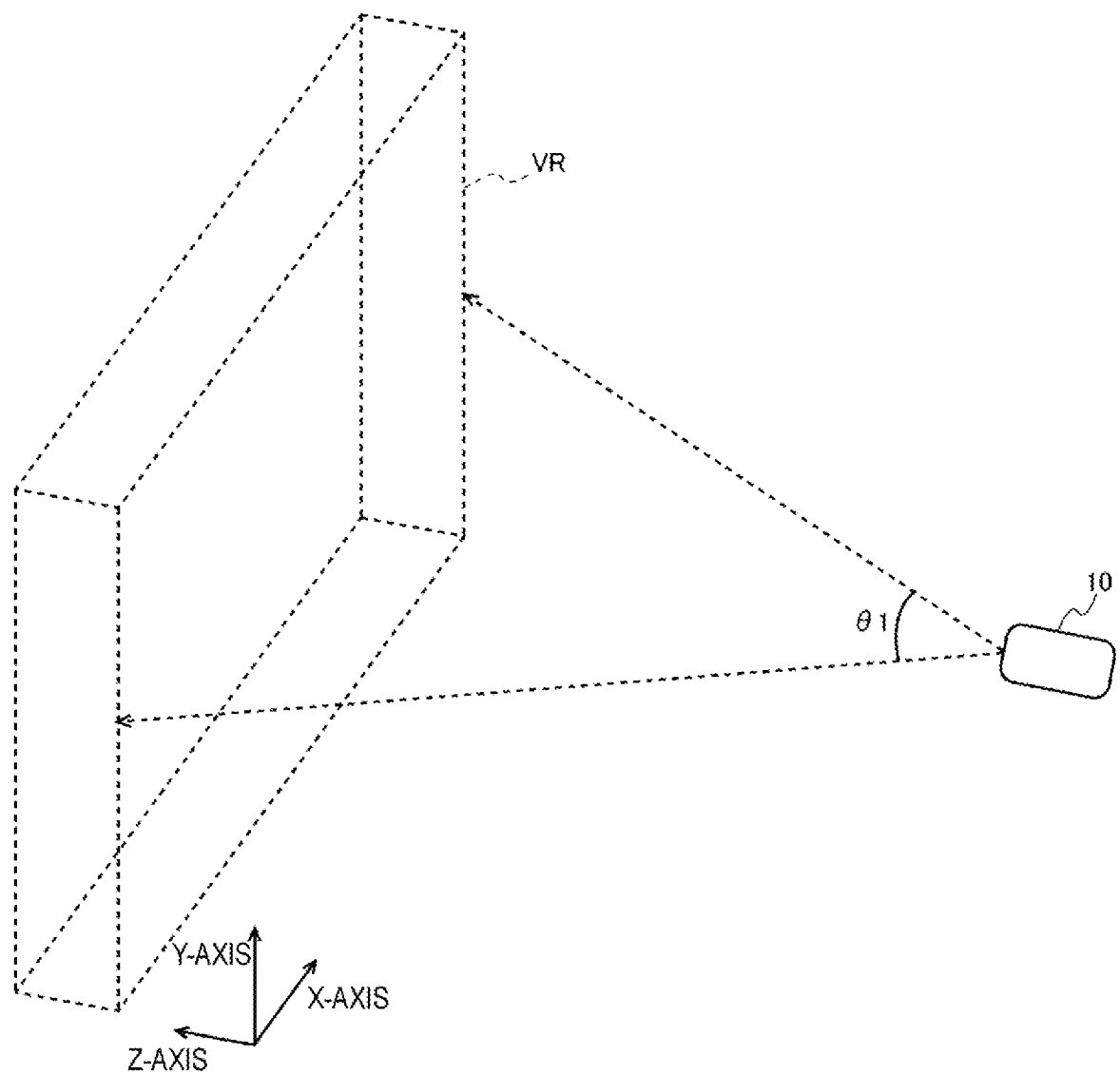
FIG. 7 is a diagram illustrating a first angle θ1 and a second angle θ2.
Figure 8:
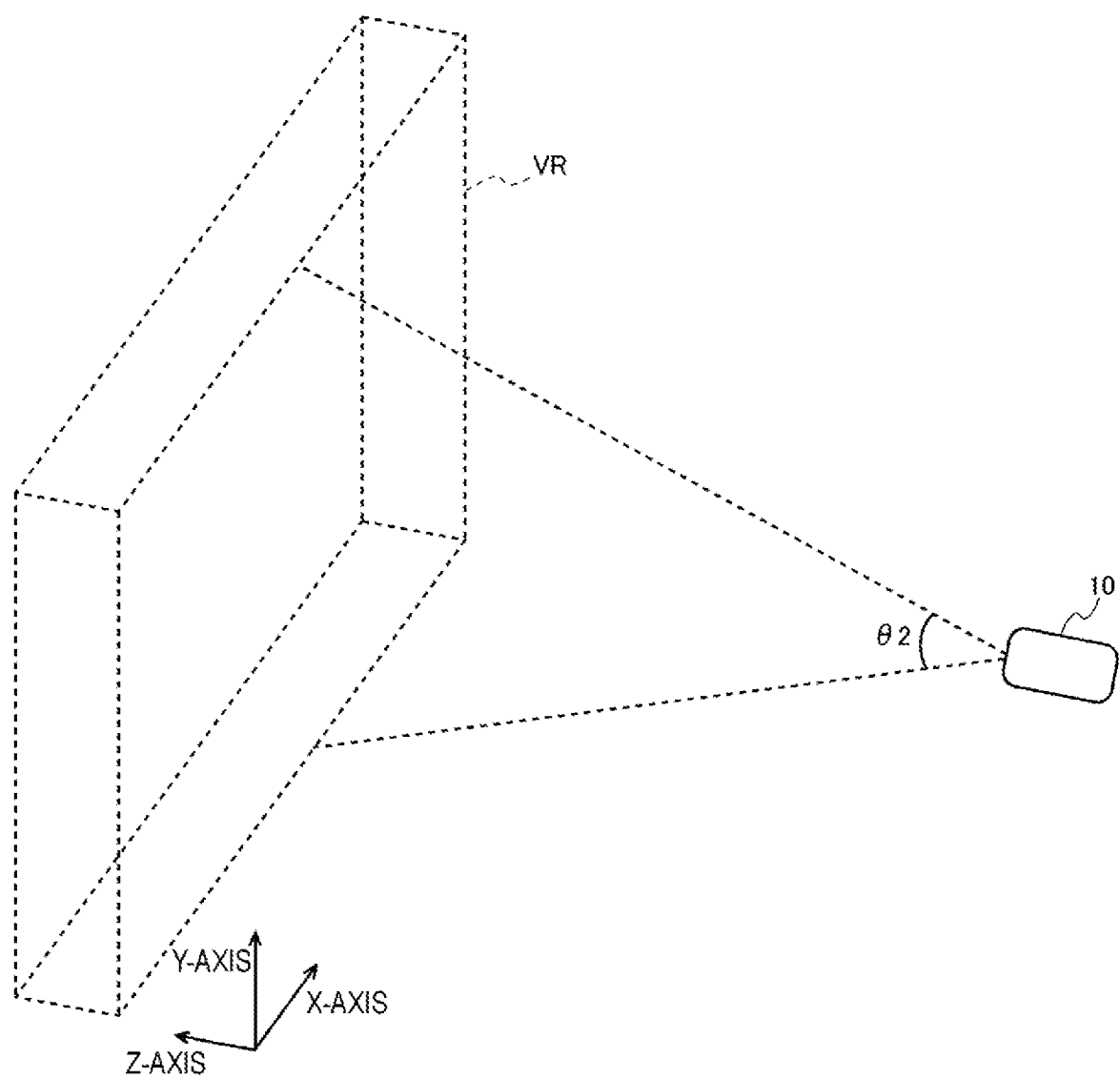
FIG. 8 is a diagram illustrating a third angle θ3 and a fourth angle θ4.

FIG. 7 is a diagram illustrating the first angle θ1. FIG. 8 is a diagram illustrating the second angle θ2.

In FIG. 7 and FIG. 8, the X-axis corresponds to the crosswise direction of the display area VR, the Y-axis corresponds to the lengthwise direction of the display area VR, and the Z-axis corresponds to the depth direction of the display area VR. FIG. 7 and FIG. 8 illustrate a case in which the X-axis is set in a direction parallel to the horizontal direction, the left end of the display area VR is the origin, and the positive direction of the X-axis is set in the right direction as seen from the side of the user. Further, FIG. 7 and FIG. 8 illustrate a case in which the Y-axis is set in a direction parallel to the vertical direction, the lower end of the display area VR is the origin, and the positive direction of the Y-axis is set vertically upward. Moreover, the "depth direction" corresponds to a direction that the user wearing the image display unit 20 on the head faces, that is, the front-back direction. FIG. 7 and FIG. 8 illustrate a case in which the positive direction of the Z-axis is set in a direction away from the user.

Note that FIG. 7 and FIG. 8 illustrate a case in which the X-axis is set in a direction parallel to the horizontal direction, but the crosswise direction of the display area VR is decided according to the tilting of the head of the user. That is, in a case where the user tilts the head in the direction of the left shoulder, the X-axis is also tilted to be set.

First of all, the user sets the first angle θ1.

The user operates the control device 10A such that the pre-set side (more particularly, the normal line of the side) of the control device 10A faces the left end of the display area VR. Hereinafter, the side will be called an operation side. For example, a case in which the side where the power switch 18 and the LED indicator 12 are provided is the operation side will be described. The user adjusts the orientation of the control device 10A held in his/her hand such that the operation surface of the track pad 14 faces upward, and the normal line of the operation side faces the left end of the display area VR. At this time, the user, for example, maintains the attitude of the control device 10A so that the operation surface of the track pad 14 is facing upward, and is leveled off to the maximum possible extent. The user inputs a pre-set operation when the normal line of the operation side of the control device 10A is turned to the left end of the display area VR. This operation may be an operation on the operator 13 provided in the operation unit 110, or may be an operation on the track pad 14. The controller 150 acquires a detected value of the magnetic sensor 113 when the pre-set operation is input. The controller 150 detects an angle of orientation from the acquired detected value, and stores the detected angle of orientation into the memory 121 as the angle of orientation corresponding to the left end of the display area VR.

Similarly, the user adjusts the orientation of the control device 10A held in his/her hand such that the operation surface of the track pad 14 faces upward, and the normal line of the operation side faces the right end of the display area VR. At this time, the user, for example, maintains the attitude of the control device 10A so that the operation surface of the track pad 14 is facing upward, and is leveled off to the maximum possible extent. The user inputs a pre-set operation when the normal line of the operation side of the control device 10A is turned to the right end of the display area VR. The controller 150 acquires a detected value of the magnetic sensor 113 when the pre-set operation is input. The controller 150 detects an angle of orientation from the acquired detected value, and stores the detected angle of orientation into the memory 121 as the angle of orientation corresponding to the right end of the display area VR. The controller 150 calculates a difference between the angle of orientation when the operation side of the control device 10A is turned to the left end of the display area VR, and the angle of orientation when the operation side is turned to the right end of the display area VR as the first angle θ1. The controller 150 stores the determined first angle θ1 into the storage unit 160.

Similarly, the user turns the operation side of the control device 10A to the upper end of the display area VR to input a pre-set operation. The controller 150 detects the inclination angle of the control device 10A based on the detected value of the six-axis sensor 111, and stores the detected inclination angle into the memory 121 as the inclination angle corresponding to the upper end of the display area VR. Further, the user turns the operation side of the control device 10A to the lower end of the display area VR to input a pre-set operation. The controller 150 detects the inclination angle of the control device 10A based on the detected value of the six-axis sensor 111, and stores the detected inclination angle into the memory 121 as the inclination angle corresponding to the lower end of the display area VR. The controller 150 calculates a difference between the inclination angle obtained when the operation side of the control device 10A is turned to the upper end of the display area VR, and the inclination angle obtained when the operation side is turned to the lower end of the display area VR, as the second angle θ2. The controller 150 stores the calculated second angle θ2 into the storage unit 160.

The reference waveform 162 is also stored in the storage unit 160. The reference waveform 162 is the waveform of a minute voltage measured by a myoelectric sensor. The details of the reference waveform 162 will be described later.

The storage unit 160 also stores the content data 163. The content data 163 is the data of contents including images and movies to be displayed on the image display unit 20 through control by the controller 150, and includes image data and movie data. The content data 163 may also include sound data. The content data 163 may also include image data of a plurality of images, and in such a case, the plurality of images are not limited to images to be displayed simultaneously on the image display unit 20. The content data 163 may be also bidirectional content such that when the content is displayed on the image display unit 20, an operation of the user is received by the control device 10A, and the controller 150 executes the process corresponding to the received operation. In this case, the content data 163 may include image data of a menu screen to be displayed when an operation is received, data determining a process corresponding to an item included in the menu screen, and the like.

The controller 150 includes functions of an OS 151, an image processing unit 152, the imaging controller 153, and a display controller 154.

The function of the OS 151 is a function of a control program stored in the storage unit 160, and the other components of the controller 150 is a function of the application program to be executed on the OS 151.

The image processing unit 152 is configured to generate a signal to be transmitted to the right display unit 22 and the left display unit 24 based on the image data or movie data to be displayed on the image display unit 20. Signals generated by the image processing unit 152 may be a vertical synchronizing signal, a horizontal synchronizing signal, a clock signal, an analog image signal, or the like.

The image processing unit 152 may, as necessary, perform a resolution conversion process of converting the resolution of image data into a resolution appropriate for the right display unit 22 and the left display unit 24. The image processing unit 152 may also execute an image adjustment process of adjusting a brightness and chroma of the image data, a 2D/3D conversion process of creating 2D image data from 3D image data, crating 3D image data from 2D image data, or the like. When one of the image processes is executed, the image processing unit 152 generates a signal for displaying an image based on the processed image data and transmits the signal to the image display unit 20 via the coupling cable 40.

The image processing unit 152 may be achieved when the main processor 140 executes a program or may be a separate hardware from the main processor 140 (e.g., digital signal processor (DSP)).

The imaging controller 153 controls the camera 61 and the inner camera 62 to execute capturing images and generate imaging data in each of the cameras 61 and 62. The imaging controller 153 temporarily stores the imaging data acquired from the camera 61 and the inner camera 62 into the storage unit 160. Further, in a case where the camera 61 or the inner camera 62 is configured as a camera unit including a circuit configured to generate imaging data, the imaging controller 153 acquires the imaging data from the camera 61 or the inner camera 62 to temporarily store the imaging data into the storage unit 160.

The display controller 154 is configured to generate a control signal for controlling the right display unit 22 and the left display unit 24, and use the control signal to control the generation and emission of the imaging light by each of the right display unit 22 and the left display unit 24. Specifically, the display controller 154 controls the OLED drive circuits 225 and 245 to cause the OLED panels 223 and 243 to display images. Based on a signal output from the image processing unit 152, the display controller 154 controls a timing when the OLED drive circuits 225 and 245 draw images on the OLED panels 223 and 243 and controls brightness of the OLED panels 223 and 243, for example.

Figure 9:
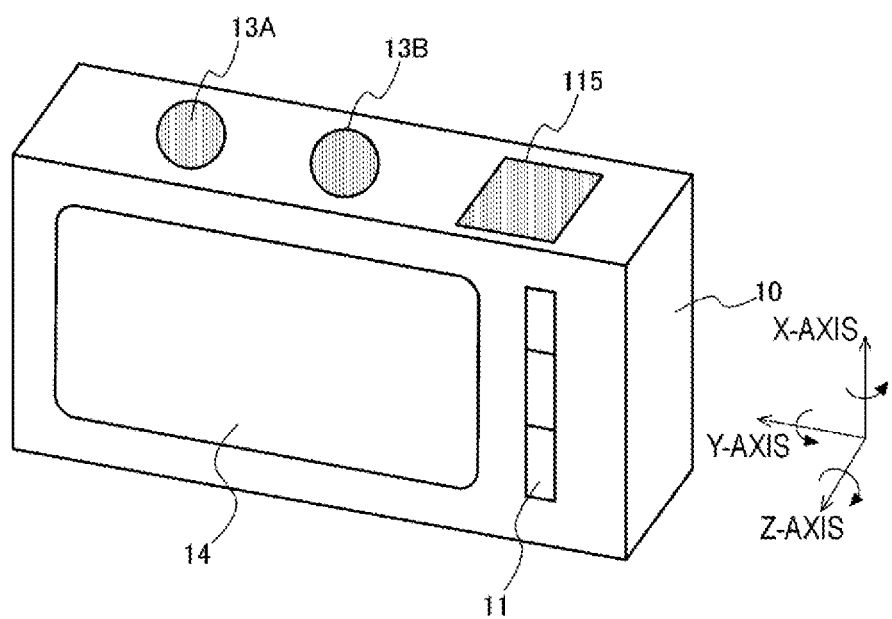
FIG. 9 is a diagram illustrating a control device.

FIG. 9 is a diagram illustrating the control device 10A.

The display controller 154 also changes the display position of the pointer 330 through an operation performed by using the control device 10A. The operation performed by using the control device 10A is an operation for changing the display position of the pointer 330 in correspondence to the position, direction, and displacement of the control device 10A. The six-axis sensor 111 and the magnetic sensor 113 are mounted on the control device 10A. The display controller 154 detects the position, direction, and displacement of the control device 10A based on an amount of rotation around the x-axis (left-right direction), y-axis (up-down direction), and z-axis (front-back direction) illustrated in FIG. 9, the angle of orientation detected by the magnetic sensor 113, or the like. Hereinafter, the displacement of the control device 10A will be called "motion", and the position and direction of the control device 10A will be called "attitude". The display control device 154 detects the motion and attitude of the control device 10A based on the detected values by the six-axis sensor 111 and the magnetic sensor 113, and changes the display position of the pointer 330 in the display area VR to a position corresponding to the detected motion and attitude. The operation where the user holds the control device 10A in his/her hand, moves the control device 10A held in his/her hand, and changes the attitude so as to displace the control device 10A corresponds to a "first operation" of the invention.

Further, the control device 10A is provided with the movement change button 13A, the determination button 13B, and the touch sensor 115. The display controller 154 is configured to execute an operation received from the movement change button 13A and the determination button 13B, or a process corresponding to the detection result of the touch sensor 115. FIG. 9 illustrates an arrangement of the movement change button 13A and the determination button 13B provided as operators 13, as well as the touch sensor 115 on either side of the control device 10A.

The movement change button 13A is a button configured to change the movement system of the pointer 330. The display controller 154, upon receiving an operation of pressing the movement change button 13A for a short time (short-press operation), changes the movement system of the pointer 330. The movement systems of the pointer 330 include an absolute coordinate system and a relative coordinate system.

The absolute coordinate system is a system in which the angle of the control device 10A and the display position of the pointer 330 in the display area VR have one-to-one association.

In the absolute coordinate system, first, the first angle θ1 and the second angle θ2 are set. The method of setting the first angle θ1 and the second angle θ2 will be omitted as explained earlier. The user operates the control device 10A to change the orientation of the control device 10A so that the operation side of the control device 10A is in the direction in which the pointer 330 is to be moved. That is, the user changes the orientation of the control device 10A so that the position of the pointer 330 to be displayed comes on the extension line where the normal line of the operation side of the control device 10A extends.

In a case where the operation of the control device 10A is detected based on the detected values of the six-axis sensor 111 and the magnetic sensor 113, the display controller 154 detects the rotation direction and the rotation amount (angle) of the control device 10A based on the detected values. The rotation direction and the rotation amount (angle) correspond to an "operation direction and operation amount of the first operation" of the invention. The display controller 154 decides the movement direction and the movement amount of the pointer 330 based on the detected rotation direction and rotation amount (angle) of the control device 10A. The display controller 154 moves the pointer 330 based on the decided movement direction and movement amount.

Specifically, the display controller 154 determines whether there is a change in the attitude of the control device 10A based on the detection result of the six-axis sensor 111 and the magnetic sensor 113. The display controller 154, upon determining that there is a change in the attitude of the control device 10A, detects the angle of orientation and the inclination angle of the control device 10A based on the detection result of the six-axis sensor 111 and the magnetic sensor 113.

The memory 121 stores information about the angle of orientation corresponding to the left end and the right end of the display area VR, the inclination angle corresponding to the upper end and the lower end of the display area VR, the first angle θ1, and the second angle θ2. Based on the information described above, the display controller 154 specifies the position of the display area VR corresponding to the detected angle of orientation and the inclination angle, specifically, specifies the pixel position in each of the OLED panels 223 and 243 to display the pointer 330. The display controller 154 may also specify a common pixel position in the OLED panel 223 and the OLED panel 243.

The relative coordinate system is a system in which the display position of the pointer 330 is changed in the display area VR in correspondence to the operation amount of the control device 10A. The setting data 161 includes information indicating the movement amount of the pointer 330 per unit rotation amount (for example, 1 degree) of the control device 10A, specifically, information indicating the number of pixels of the OLED panels 223 and 243. In a case where the operation of the control device 10A is detected based on the detected values of the six-axis sensor 111 and the magnetic sensor 113, the display controller 154 detects the rotation direction and the rotation amount (angle) of the control device 10A based on the detected values. The display controller 154 decides the movement direction and the movement amount of the pointer 330 based on the detected rotation direction and rotation amount (angle) of the control device 10A, and the setting data 161. The display controller 154 moves the pointer 330 based on the decided movement direction and movement amount. In the relative coordinate system, the movement amount of the pointer 330 is a movement mount corresponding to the time during which the operation performed by using the control device 10A is maintained. That is, the longer a time for which the user operates the control device 10A (for example, performs a rotation operation) is, the larger the movement amount of the pointer 330 is in the display area VR.

The display controller 154, upon receiving an operation on the movement change button 13A, changes the movement system of the pointer 330. For example, in a case that the absolute coordinate system is set for the movement system of the pointer 330, upon receiving a short-press operation in which the movement change button 13A is pressed for a short time, the display controller 154 changes the movement system of the pointer 330 to the relative coordinate system. In a case that the relative coordinate system is set for the movement system of the pointer 330, upon receiving a short-press operation in which the movement change button 13A is pressed for a short time, the display controller 154 changes the movement system of the pointer 330 to the absolute coordinate system.

The display controller 154, upon receiving an operation of pressing the movement change button 13A for a long time (long-press operation), executes a process different from the short-press operation on the movement change button 13A.

For example, in a case where there is a change in the detection result of the six-axis sensor 111 while a long-press operation on the movement change button 13A is detected, the display controller 154 moves the display position of the pointer 330 in accordance with the detection result of the six-axis sensor 111. In a case where the finger of the user is removed from the movement change button 13A, and the long-press operation on the movement change button 13A is canceled, the display controller 154 also changes the size of the image the display position of which overlaps the pointer 330 when the long-press operation is canceled, with the display position of the pointer 330 as the center. The operation of canceling the long-press operation on the movement change button 13A corresponds to a "fourth operation" of the invention, and in such a case, the operation unit 110 operates as a "receiving unit" of the invention. Further, in a case that the movement change button 13A is pressed for a predetermined time or longer, it is determined that the fourth operation is detected, and the size of the image may be magnified or reduced by the operation for displacing the control device 10A that is the first operation performed until a finger is removed from the movement change button 13A.

For example, in the example illustrated in FIG. 6, the pointer 330 indicates the saddle position in the image 310 of the bicycle. In a case where the long-press operation on the movement change button 13A is canceled, the display controller 154 magnifies or reduces the size of the image 310 of the bicycle by a fixed size at each fixed period of time, with the saddle (the portion including the operation image) the display position of which overlaps the pointer 330 as the center. Further, in a case where an operation on the movement change button 13A (short-press operation or long-press operation) is detected, the display controller 154 stops the process of magnifying or reducing the image, and changes the display position of the pointer 330 in accordance with the detection result of the six-axis sensor 111.

Moreover, the display controller 154 may magnify or reduce an image overlapping the pointer 330 based on the detected value of the six-axis sensor 111 obtained after a long-press operation on the movement change button 13A is canceled.

For example, in a case that an operation of moving the control device 10A forward (in a Z-axis positive direction) is detected, the display controller 154 magnifies the image with the position overlapping the pointer 330 as the center. Further, in a case that an operation of moving the control device 10A backward (in a Z-axis negative direction) is detected, the display controller 154 also reduces the image with the position overlapping the pointer 330 as the center.

Next, the determination button 13B and the touch sensor 115 will be described.

The determination button 13B is a button for confirming an operation. For example, in a case where an operation on the determination button 13B is received in a state where a plurality of icons 320 are displayed in the display area VR, the display controller 154 determines that the icon displayed at the position overlapping the pointer 330 is selected.

Figure 10:
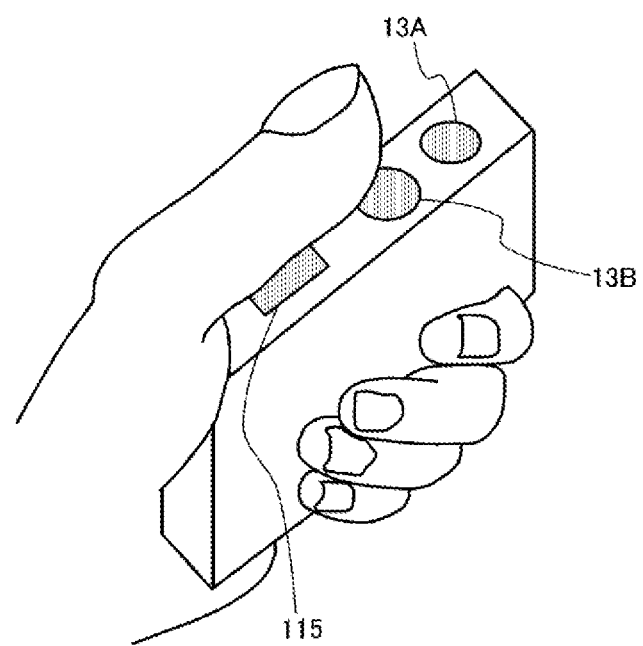
FIG. 10 is a diagram illustrating a state in which a user holds the control device in his/her hand.

FIG. 10 is a diagram illustrating a state in which the user holds the control device 10A in his/her hand.

The user holds the control device 10A in his/her hand with the side on which the movement change button 13A, the determination button 13B, and the touch sensor 115 are provided facing upward so as to enable the operation on the determination button 13B. At this time, the user holds the control device 10A in his/her hand such that the determination button 13B is located at the side of the tip of the thumb, and the touch sensor 115 is located at the side of the base of the thumb.

In a case where the user presses the determination button 13B while holding the control device 10A in his/her hand, the base of the thumb will come in contact with the touch sensor 115 before the tip of the thumb comes in contact with the determination button 13B. Upon detecting a contact, the touch sensor 115 outputs, to the display controller 154, a detection signal indicating that a contact is detected. The display controller 154 operates as a "receiving unit" configured to receive the second operation. Further, the touch sensor 115 may be configured to change a signal level of the detection signal to be output to the display controller 154 so as to notify the display controller 154 that a contact has been detected.

In a case where the detection signal is input from the touch sensor 115, the display controller 154 shifts to an operation state in which the display position of the pointer 330 is not changed even if a change in the motion or attitude of the control device 10A is detected based on the detected value of the six-axis sensor 111. Therefore, the operation of changing the display position of the pointer 330, and the operation of pressing the determination button 13B can be detected as separate operations. That is, in a case where the hand of the user shakes when the user attempts to press the determination button 13B, the pointer 330 does not move even if the control device 10A moves and the attitude of the control device 10A changes. Therefore, the user can operate the determination button 13B at the intended display position of the pointer 330.

In the exemplary embodiment, a case in which the control device 10A includes the touch sensor 115 is described, but instead of the touch sensor 115, a proximity sensor configured to detect a proximity operation by a detection object without contact may be provided in the control device 10A. Since the proximity sensor can detect an approach of a finger being the detection object, the movement of the pointer 330 as a result of a change in the motion and attitude of the control device 10A can be regulated earlier. Therefore, the user can operate the determination button 13B at the intended position of the pointer 330 with more certainty.

The proximity sensor may be also arranged at the position where the touch sensor 115 is provided in FIG. 9, may be superimposed on the determination button 13B, or may be arranged near the determination button 13B. In such a case, the operation on the determination button 13B by the user can be more securely detected such that the display position of the pointer 330 does not change as a result of the motion and attitude of the control device 10A.

Figure 11:
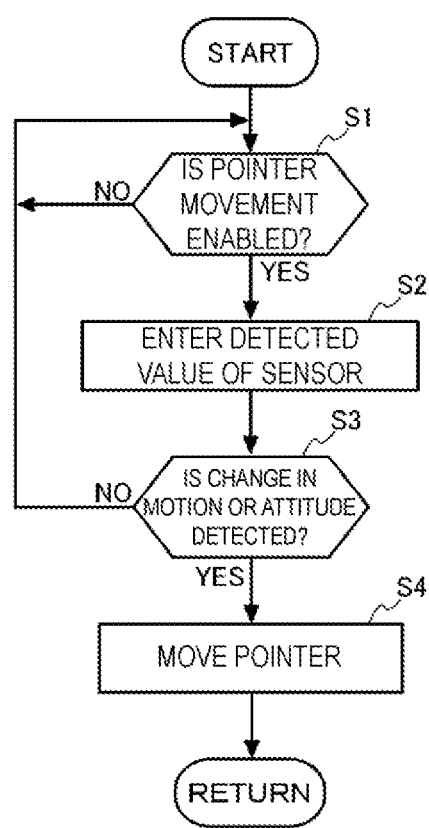
FIG. 11 is a flowchart illustrating an operation of the controller.

FIG. 11 is a flowchart illustrating an operation of the display controller 154.

First of all, the display controller 154 determines whether the movement of the pointer 330 is enabled (step S1). The display controller 154 determines a detection signal is input from the touch sensor 115. In a case that a detection signal is not input from the touch sensor 115, the display controller 154 determines that the movement of the pointer 330 is enabled, and in a case that a detection signal is input, the display controller 154 determines that the movement of the pointer 330 is disabled.

Upon determining that the movement of the pointer 330 is disabled (step S1/NO), the display controller 154 returns to the determination in step S1. Further, upon determining that the movement of the pointer 330 is enabled (step S1/YES), the display controller 154 enters the detected value of the six-axis sensor 111 (step S2). The display controller 154 determines based on the entered detected value of the six-axis sensor 111 as to whether a change has occurred in the motion or attitude of the control device 10A (step S3). Upon determining that no change has occurred in the motion or attitude of the control device 10A (step S3/NO), the display controller 154 returns to the determination in step S1. Further, in a case that the display controller 154 determines based on the detected value of the six-axis sensor 111 that a change has occurred in the attitude of the control device 10A (step S3/YES), the display controller 154 calculates the movement direction and the movement amount based on the detected value of the six-axis sensor 111. Thus, the display controller 154 moves the display position of the pointer 330 in the calculated movement direction by as much as the movement amount (step S4). Thereafter, the display controller 154 returns to the determination in step S1.

Figure 12:
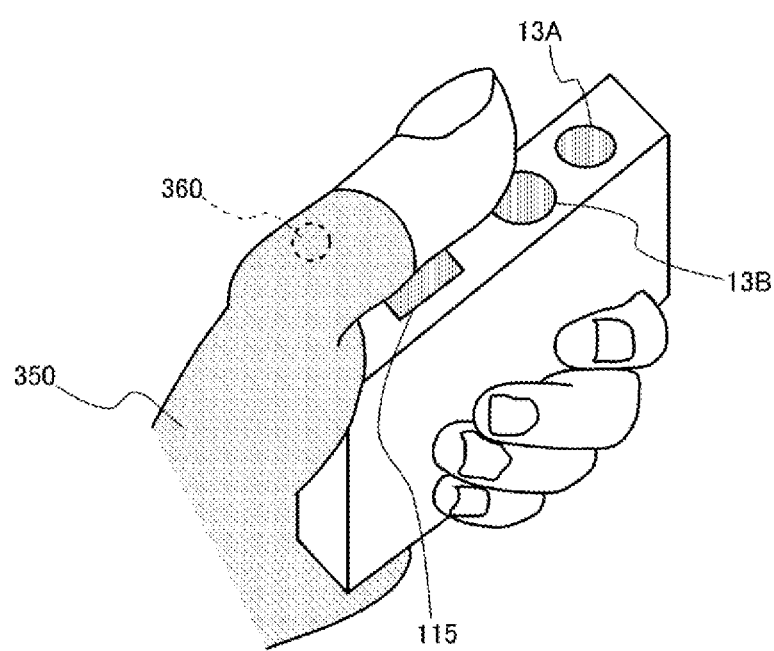
FIG. 12 is a diagram illustrating a state in which a user wears a glove in his/her hand.

FIG. 12 is an explanatory diagram for describing another method of detecting an operation on the determination button 13B. Particularly, FIG. 12 is a diagram illustrating a state in which the user is wearing, in his/her hand, a glove 350 for measuring myogenic potential.

The user wears the glove 350 for measuring myogenic potential in the hand holding the control device 10A. The glove 350 includes a myoelectric sensor (not illustrated) for measuring a minute voltage generated when the user moves the muscles. Further, the glove 350 includes a communication unit 360 configured to perform short-range wireless communication such as Bluetooth, and transmits data indicating a waveform of the measured minute voltage to the communication unit 119 of the control device 10A by the communication unit 360.

The reference waveform 162 is stored in the storage unit 160.

The reference waveform 162 is a signal waveform measured by the myoelectric sensor of the glove 350 with the user wearing the glove 350. More specifically, the reference waveform 162 is the waveform of the minute voltage measured by the myoelectric sensor when the user performs the operation of pressing down the thumb (moving the thumb in the direction of the index finger).

The display controller 154 compares the waveform of the minute voltage received from the glove 350 with the reference waveform 162 read from the storage unit 160, and determines whether a waveform matching the reference waveform 162 is included in the received waveform. In a case that a waveform matching the reference waveform 162 is included in the received waveform, the display controller 154 determines that the thumb of the user has moved. In such a case, the display controller 154 shifts to an operation state in which the display position of the pointer 330 is not changed even if a change in the motion or attitude of the control device 10A is detected based on the detected value of the six-axis sensor 111.

In FIG. 12, a case in which the myoelectric sensor is provided in the glove 350 is described, but the member provided with the myoelectric sensor is not limited to the glove 350. For example, the myoelectric sensor may be provided in an arm band or the like worn on an arm of the user.

Figure 13:
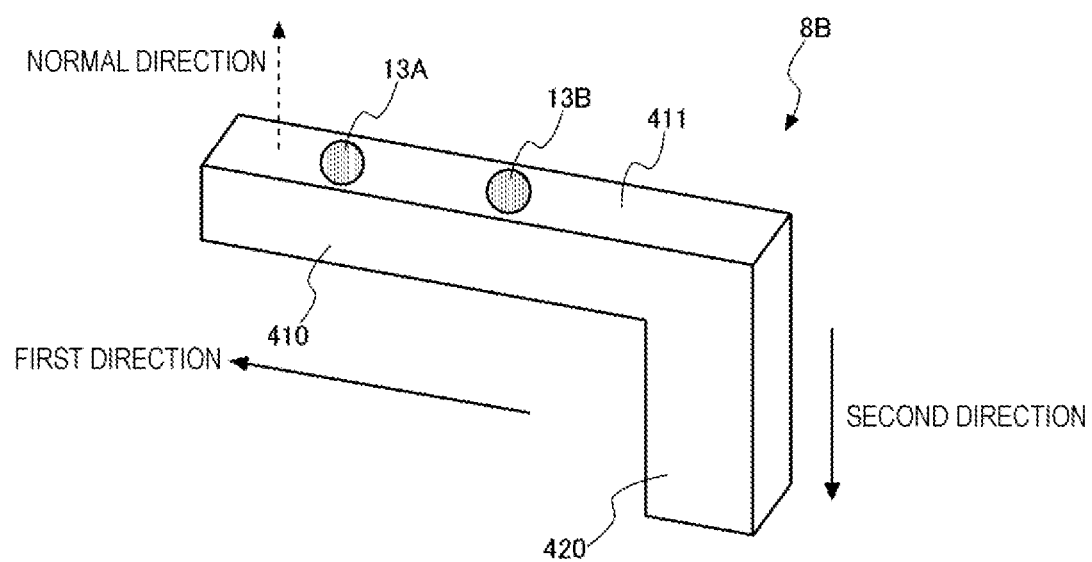
FIG. 13 is a diagram illustrating a modification of the control device.
Figure 14:
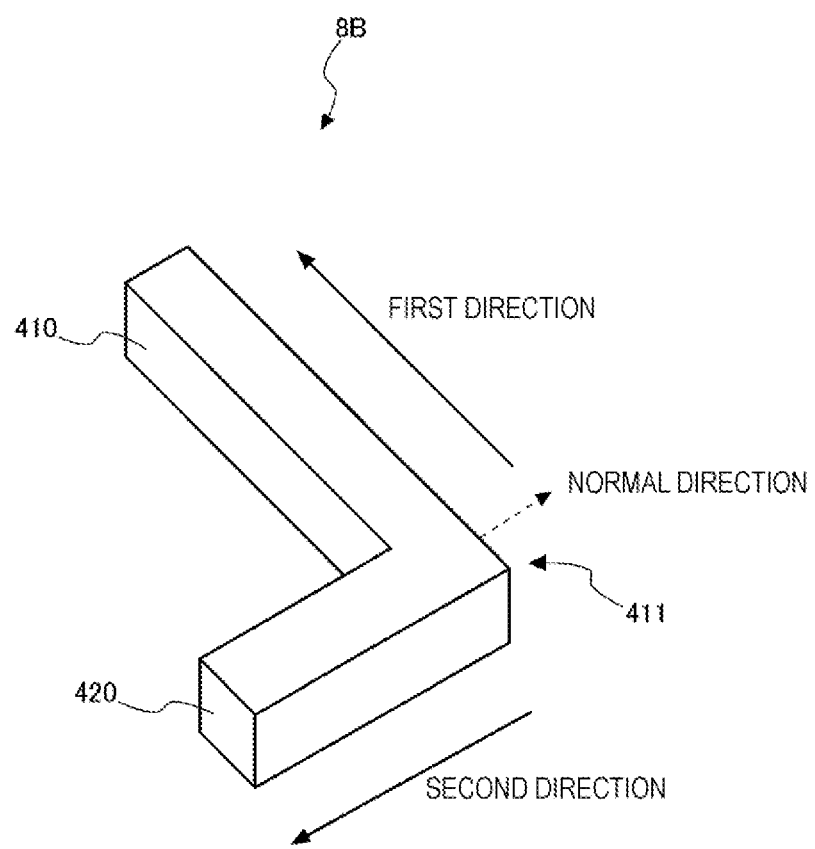
FIG. 14 is a diagram illustrating another modification of the control device.

FIG. 13 and FIG. 14 are diagrams illustrating modifications of the control device 10A.

A control device 10B being a modification as illustrated in FIG. 13 and FIG. 14 has a shape in which a case 8B is bent in an L-shape. The case 8B includes a first housing 410 extending in a first direction, and a second housing 420 extending in a second direction. The length of the first housing 410 is longer than the length of the second housing 420. The second housing 420 is formed at an end in an extension direction of the first housing 410, and the angle θ formed by the first housing 410 and the second housing 420 is approximately 90 degrees.

When operating the control device 10B, the user holds the second housing 420 in his/her hand, and turns the first housing 410 in a direction in which the pointer 330 is to be moved.

In a case that the display controller 154 determines based on the detected value of the six-axis sensor 111 that the normal direction of the surface of the control device 10B on which the movement change button 13A and the determination button 13B are provided (hereinafter, referred to as an operation side 411) is the upward direction, the display controller 154 sets the movement of the pointer 330 to be enabled. The case in which the normal direction is the upward direction includes a case in which the normal direction is the vertical direction, and in addition, includes the range where the normal direction is within a predetermined angle (for example, 30 degrees) from the vertical direction. Further, in a case that the display controller 154 determines based on the detected value of the six-axis sensor 111 that the normal direction of the operation side 411 is a direction other than the upward direction, the display controller 154 sets the movement of the pointer 330 to be disabled. FIG. 13 illustrates the case where the normal direction of the operation side 411 is the upward direction, and FIG. 14 illustrates the case where the normal direction of the operation side 411 is the horizontal direction.

The storage unit 160 stores the detected value of the six-axis sensor 111 indicating the attitude of the control device 10B in a case where the normal direction of the operation side 411 is a direction other than the upward direction. The attitude of the control device 10B in a case where the normal direction of the operation side 411 is a direction other than the upward direction corresponds to an "attitude pattern" of the invention. In a case that the display controller 154 determines based on the detected value of the six-axis sensor 111 that the normal direction of the operation side 411 is a direction other than the upward direction, the display controller 154 sets the movement of the pointer 330 to be disabled.

Further, the direction of the operation side 411 when the movement of the pointer 330 is enabled is not limited to the case when the normal direction of the operation side 411 is the upward direction. For example, the normal direction of the operation side 411 may be vertically downward, or may be horizontally leftward or horizontally rightward. Similarly, the direction of the operation side 411 when the movement of the pointer 330 is disabled is not limited to the case that the normal direction of the operation side 411 is the horizontal direction, and may be the vertically upward or vertically downward direction. Further, the surface on which the orientation or attitude of the control device 10B is determined is not limited to the operation side 411, and the movement of the pointer 330 may be switched between enabled and disabled with reference to another surface.

Figure 15:
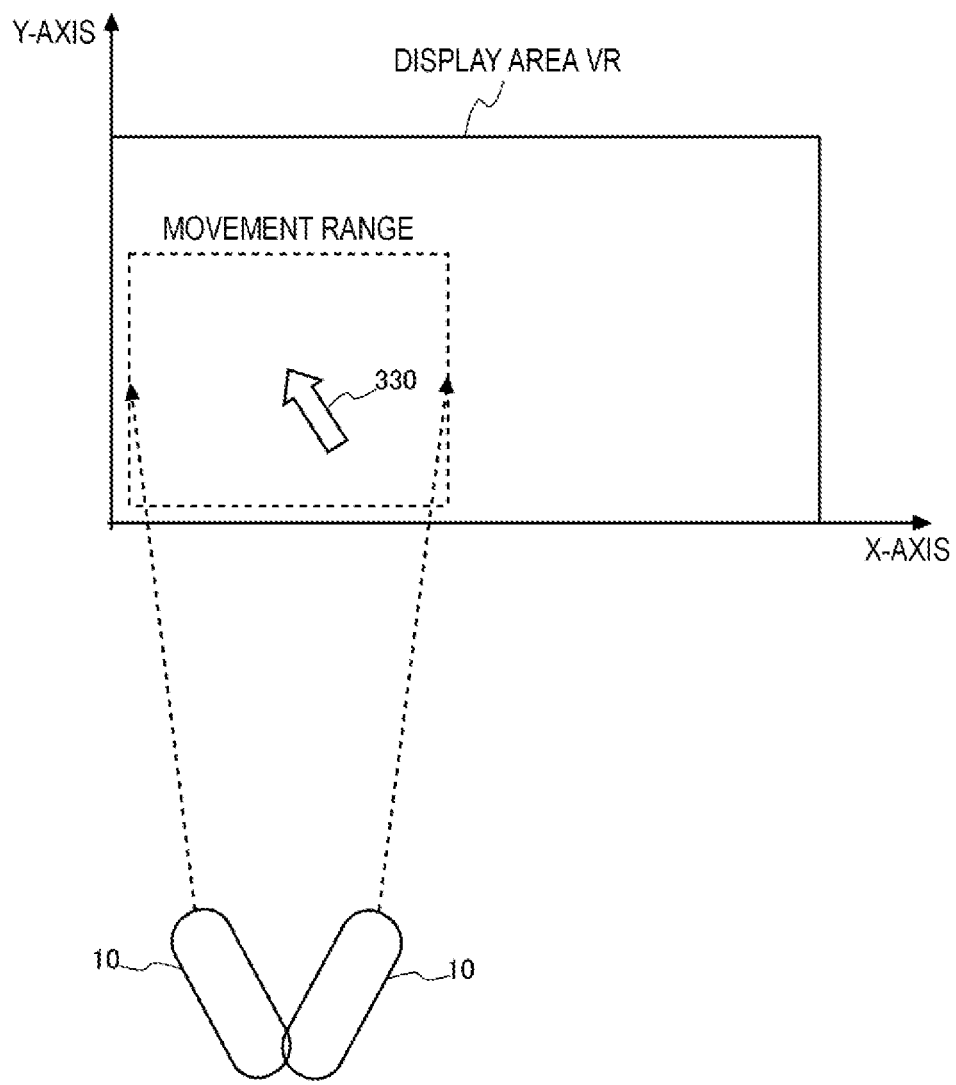
FIG. 15 is a diagram illustrating a situation in which a movement range of a pointer is limited in an absolute coordinate system.

FIG. 15 is a diagram illustrating a situation in which a movement range of the pointer 330 is limited in the absolute coordinate system.

Further, the display controller 154 may change the movement range and the movement amount of the pointer 330 between when a long-press operation on the movement change button 13A is received and when a long-press operation is not received. For example, in a case that the absolute coordinate system is selected for the movement system of the pointer 330, in a case where the movement change button 13A is pressed for a long time, a pre-set range with reference to the display position of the pointer 330 is set as the movement range. The movement range is a range in which the pointer 330 can be moved through the operation of the control device 10A. The display controller 154 adds or subtracts a pre-set value to or from an angle of orientation and an inclination angle detected based on the detected value of the six-axis sensor 111 or the magnetic sensor 113 to determine the angle of orientation and the inclination angle corresponding to the left end, the right end, the upper end, and the lower end of the movement range. Thus, the control device 10A is operated to limit the movement range of the pointer 330. As a result, the display position of the pointer 330 does not deviate significantly from the intended position, and therefore, the time taken to move the pointer 330 to the intended position can be shortened.

Further, in a case that the relative coordinate system is selected for the movement system of the pointer 330, in a case where the movement change button 13A is pressed for a long time, the display controller 154 may change the movement amount of the pointer 330 with respect to the movement amount of the control device 10A. The long-press operation on the movement change button 13A corresponds to a "third operation" of the invention, and in such a case, the operation unit 110 operates as a "receiving unit" of the invention. In a case that the movement amount of the pointer 330 is changed by the long-press operation on the movement change button 13A, the user maintains the attitude of the control device 10 so that a change does not occur in the detection result of the six-axis sensor 111 due to a change in the attitude of the control device 10. Further, in a case that the movement amount of the pointer 330 is changed, the long-press operation on the movement change button 13A and the operation of the other buttons may be detected. For example, in a case that a long-press operation is performed on the movement change button 13A and the determination button 13B, the display controller 154 may change the movement amount of the pointer 330.

Figure 16:
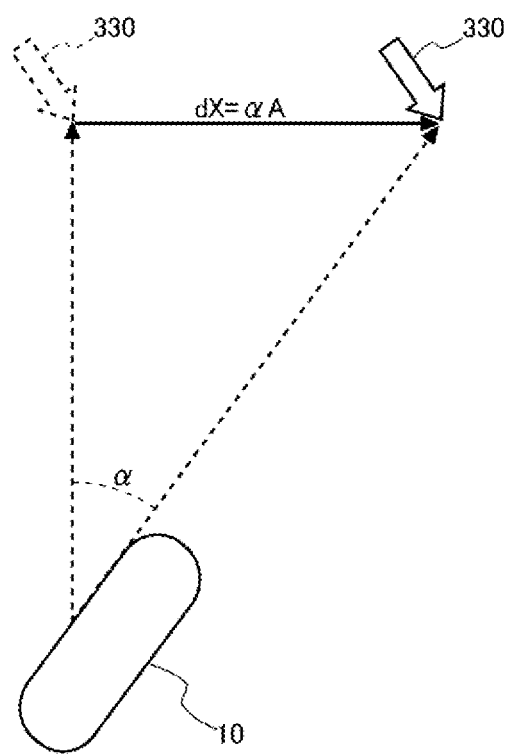
FIG. 16 is a diagram illustrating a horizontal movement amount of the pointer before limiting a movement amount.

FIG. 16 illustrates a horizontal movement amount of the pointer 330 in a case that the control device 10A is rotated by a rotation amount α before limiting the movement amount. The horizontal movement amount dX of the pointer 330 before limiting the movement amount is a value obtained by multiplying a predetermined coefficient A to the horizontal rotation amount α of the control device 10A that is detected by the six-axis sensor 111.

Figure 17:
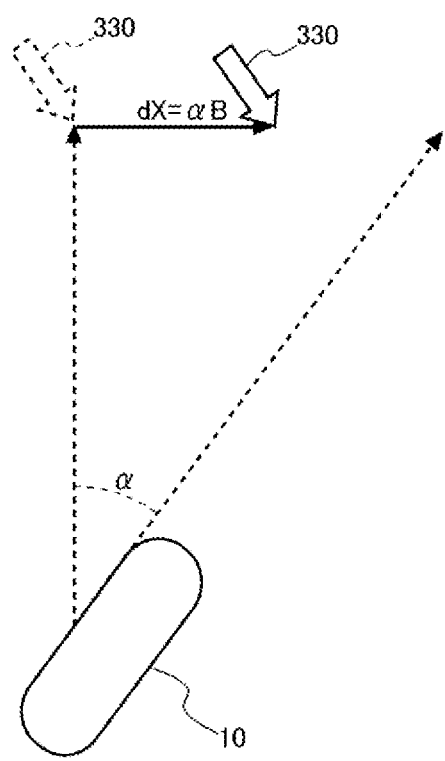
FIG. 17 is a diagram illustrating a horizontal movement amount of the pointer after limiting the movement amount.

Further, FIG. 17 illustrates a horizontal movement amount of the pointer 330 in a case that the control device 10A is rotated by the rotation amount α after limiting the movement amount. The horizontal movement amount dX of the pointer 330 after limiting the movement amount is a value obtained by multiplying a predetermined coefficient B to the horizontal rotation amount α of the control device 10A that is detected by the six-axis sensor 111. The value of the coefficient B is smaller than the value of the coefficient A. Therefore, even if the control device 10A is rotated by the same rotation amount, the movement amount of the pointer 330 after the limitation is smaller than before limiting the movement amount.

Further, the display controller 154 determines the sight line direction of the user from the imaging data of the inner camera 62 to determine the position of the display area VR gazed by the user (hereinafter, referred to as a point of fixation). In a case that the pointer 330 moves within a predetermined range with the determined point of fixation as the center, the display controller 154 may change the movement amount of the pointer 330 with respect to the movement amount of the control device 10A.

The user brings the pointer 330 closer to the intended position by performing an operation using the control device 10A, while gazing the intended position where the pointer 330 is to be moved. In a case that the pointer 330 moves within a predetermined range with the point of fixation as the center, the display controller 154 changes the movement amount of the pointer 330 with respect to the movement amount of the control device 10A. Therefore, in a case where the position of the pointer 330 moves closer to the intended position, the movement amount of the pointer 330 through an operation using the control device 10A becomes small, which makes movement of the pointer 330 to the intended position easier.

Figure 18:
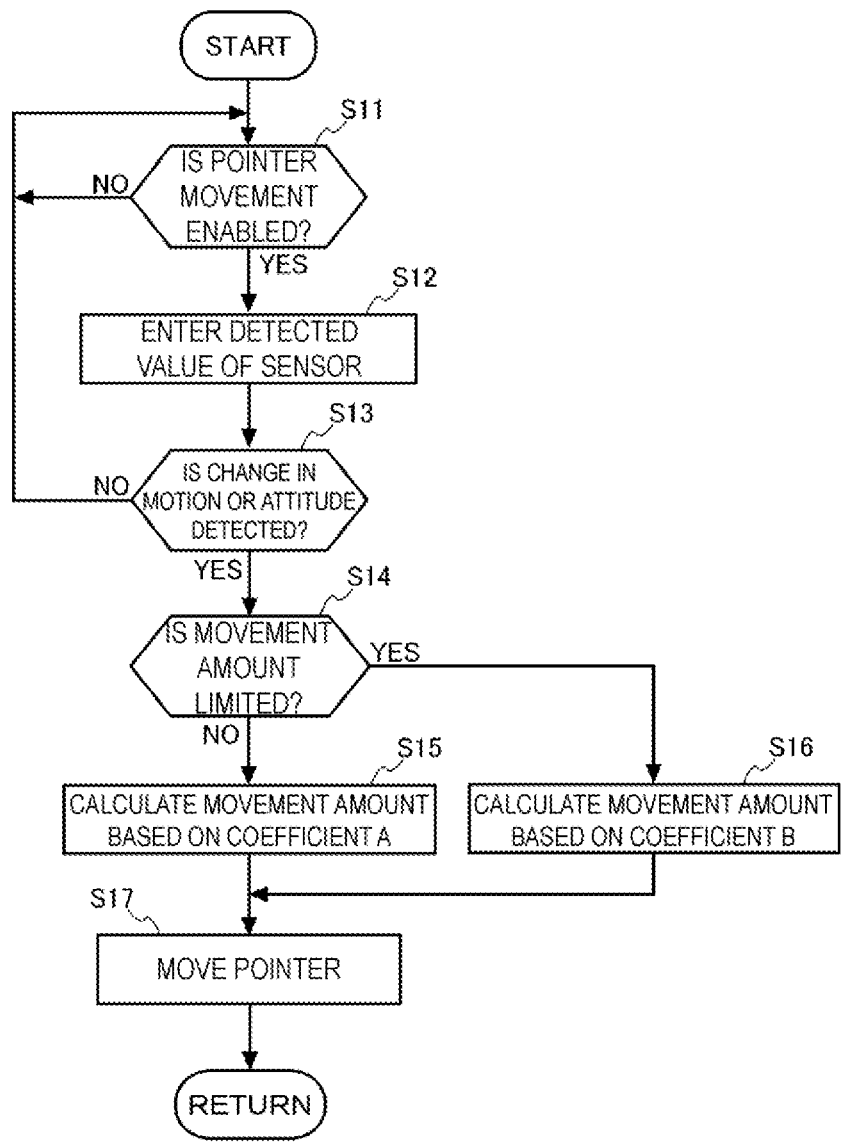
FIG. 18 is a flowchart illustrating an operation of the controller.

FIG. 18 is a flowchart illustrating an operation of the display controller 154.

First of all, the display controller 154 determines whether the movement of the pointer 330 is enabled (step S11). Upon determining that the movement of the pointer 330 is disabled (step S11/NO), the display controller 154 returns to the determination in step S11. Further, upon determining that the movement of the pointer 330 is enabled (step S11/YES), the display controller 154 enters the detected value of the six-axis sensor 111 (step S12). The display controller 154 determines based on the entered detected value of the six-axis sensor 111 as to whether a change has occurred in the motion or attitude of the control device 10A (step S13). Upon determining that no change has occurred in the motion or attitude of the control device 10A (step S13/NO), the display controller 154 returns to the determination in step S11. Further, in a case that the display controller 154 determines based on the detected value of the six-axis sensor 111 that a change has occurred in the attitude of the control device 10A (step S13/YES), the display controller 154 determines whether the movement amount of the pointer 330 is limited (step S14). For example, the display controller 154 determines whether an operation on the movement change button 13A is received to determine whether the movement amount of the pointer 330 is limited. In a case that an operation on the movement change button 13A is received, the display controller 154 determines that the movement amount of the pointer 330 is limited. Further, in a case that an operation on the movement change button 13A is not received, the display controller 154 determines that the movement amount of the pointer 330 is not limited.

In a case that the display controller 154 determines that the movement amount of the pointer 330 is not limited (step S14/NO), the display controller 154 calculates the movement direction and the movement amount by which the pointer 330 is to be moved based on the detected value of the six-axis sensor 111. At this time, the display controller 154 multiplies a predetermined coefficient A to the rotation amount α of the control device 10A detected based on the detected value of the six-axis sensor 111, and calculates the movement amount on the display area VR of the pointer 330 (step S15). Upon calculating the movement direction and the movement amount, the display controller 154 moves the display position of the pointer 330 in the calculated movement direction by the calculated movement amount (step S17). Thereafter, the display controller 154 returns to the determination in step S11.

In a case that the display controller 154 determines that the movement amount of the pointer 330 is limited (step S14/YES), the display controller 154 calculates the movement direction and the movement amount by which the pointer 330 is to be moved based on the detected value of the six-axis sensor 111. At this time, the display controller 154 multiplies a predetermined coefficient B to the rotation amount α of the control device 10A detected based on the detected value of the six-axis sensor 111, and calculates the movement amount on the display area VR of the pointer 330 (step S16). The value of the coefficient B is smaller than that of the coefficient A. Upon calculating the movement direction and the movement amount, the display controller 154 moves the display position of the pointer 330 in the calculated movement direction by the calculated movement amount (step S17).

Figure 19:
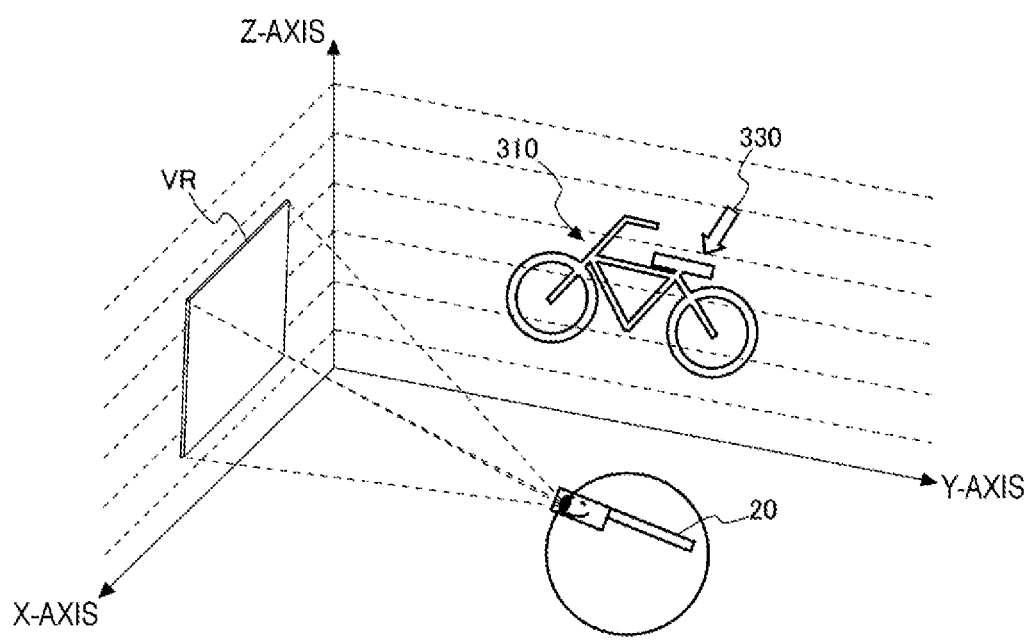
FIG. 19 is a diagram illustrating a three-dimensional space with which an image displayed by the image display unit is associated.

FIG. 19 is a diagram illustrating the coordinates of a three-dimensional space.

The six-axis sensor 235 and the magnetic sensor 237 are mounted on the image display unit 20. The display controller 154, based on the detected values of the six-axis sensor 235 and the magnetic sensor 237, is configured to associate an image displayed on the image display unit 20 with the coordinates on a three-dimensional space to manage the coordinates on the three-dimensional space of the image.

For example, the display controller 154 detects the orientation of the head (or the body) of the user based on the detected values of the six-axis sensor 235 and the magnetic sensor 237. Specifically, the display controller 154 detects the angle of orientation based on the detected value of the magnetic sensor 237, and detects the pitch angle (that is, the angle of elevation and the angle of depression), which is the angle of rotation of the head of the user around the X-axis, based on the detected value of the six-axis sensor 235. The information described above will be hereinafter referred to as orientation information.

The display controller 154, upon displaying an image by the image display unit 20, associates the identification information of the displayed image and the detected orientation information of the user to store the associated information into the storage unit 160. That is, the display controller 154 uses the orientation information of the user as the coordinates of the three-dimensional space, and associates the image and the coordinates in the three-dimensional space of the image.

The image associated with the coordinates of the three-dimensional space is displayed in the display area VR in a case that the user faces the direction of the registered coordinates. The display controller 154 detects the orientation information of the user based on the detected values of the six-axis sensor 235 and the magnetic sensor 237. When the user is facing the direction indicated in the orientation information, the display controller 154 determines, based on the orientation information stored in the storage unit 160, as to whether an image that can be displayed in the display area VR is present. In a case that an image that can be displayed in the display area VR is present, the display controller 154 displays the image in the display area VR.

The pointer 330 is also included in the image displayed by the image display unit 20.

In a case that an operation of the pointer 330 is set to be enabled, the display controller 154 changes the display position of the pointer 330 in the display area VR through an operation performed by using the control device 10A. Further, in a case that an operation of the pointer 330 is disabled, the display controller 154 associates the display position of the pointer 330 with the coordinates of the three-dimensional space, and fixes the display position at the associated position. That is, the user faces a direction different from the direction that the user faced when the operation of the pointer 330 is disabled, and in a case where the position of the pointer 330 moves outside the display area VR, the image of the pointer 330 is deleted from the display area VR. Further, in a case that the display controller 154 determines based on the orientation information detected by the six-axis sensor 235 and the magnetic sensor 237 that the user faces the direction registered as the coordinates on the three-dimensional space of the pointer 330, the display controller 154 displays the pointer 330 within the display area VR.

That is, by disabling the operation of the pointer 330, the pointer 330 can be fixed at a fixed position on the three-dimensional space. Therefore, the pointer 330 can be continued to be displayed at the position of another image displayed by the image display unit 20, for example, at the position of the image 310 of the bicycle illustrated in FIG. 19. That is, the pointer 330 can be pinned on the three-dimensional space, for example, the position of the selected image can be indicated by the pointer 330, which makes it easier to select the image displayed by the image display unit 20.

Figure 20:
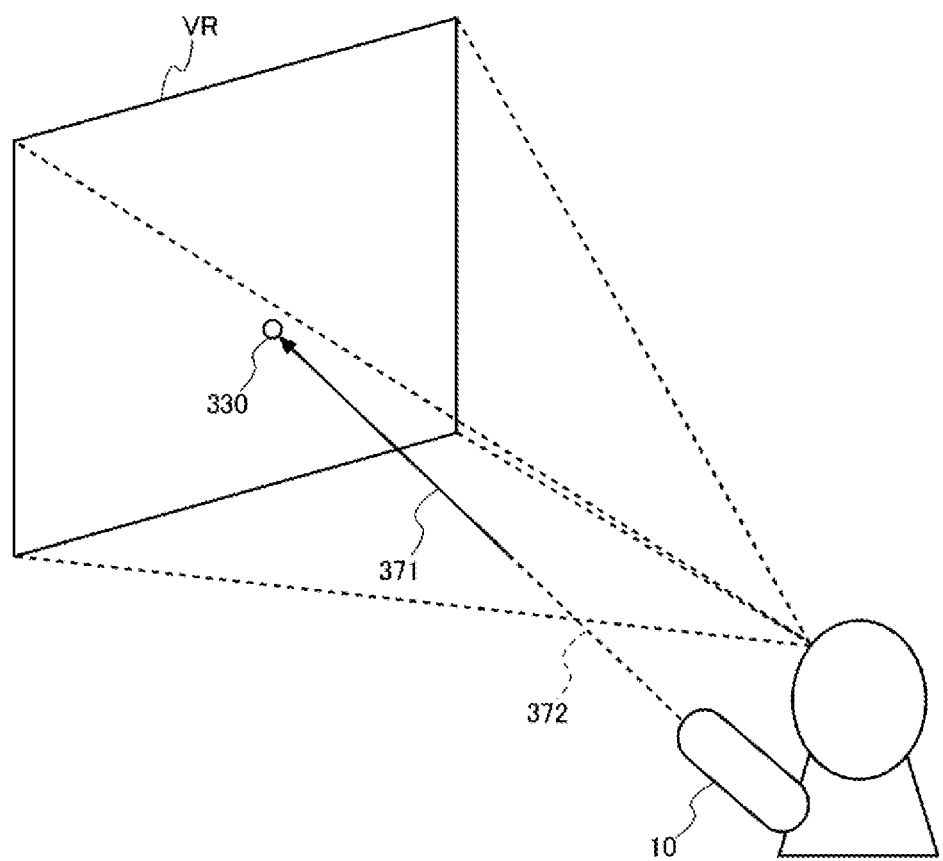
FIG. 20 is a diagram illustrating a state in which a line segment connecting the control device and the pointer is displayed in the display area.

FIG. 20 is a diagram illustrating a state in which a line segment connecting the control device 10A and the pointer 330 is displayed in the display area VR.

In order to further improve the operability of the operation performed by using the control device 10A, the display controller 154 may display a line segment connecting the control device 10A and the pointer 330 on the image display unit 20. FIG. 20 illustrates a line segment 371 connecting the control device 10A and the pointer 330. A line segment 372 indicated by a broken line in the line segment 371 is not displayed. That is, when the control device 10A and the pointer 330 are connected by a straight line, the line segment 372 located outside the display area VR is not displayed.

As described above, the HMD 100 according to the exemplary embodiment includes the image display unit 20, the six-axis sensor 111 and the magnetic sensor 113, and the display controller 154.

The image display unit 20 is worn by the user on the head, and is configured to display images.

The six-axis sensor 111 and the magnetic sensor 113 operate as a detection unit configured to detect an operation performed by using the control device 10A being the control device 10A.

The display controller 154 is configured to receive, as the second operation, the detection result of a contact operation detected by the touch sensor 115 being an operation detection unit. The display controller 154 is also configured to display the pointer 330 to be operated by the control device 10A on the image display unit 20, and move the pointer 330 based on the detection result of the six-axis sensor 111 and the magnetic sensor 113. In addition, the display controller 154, in a case that a contact operation is detected by the touch sensor 115, shifts the display position of the pointer 330 to an operation state where the display position cannot be moved through the operation performed by using the control device 10A.

Therefore, the display position of the pointer 330 does not change when the determination button 13B provided in the control device 10A is operated. Therefore, in a case that the input contents are determined based on the display position of the pointer 330 when the touch sensor 115 detects a contact operation, it is possible to input an accurate operation. As a result, it is possible to improve the operability of an operation performed by using the control device 10A.

In a case that the operation unit 110 operating as the receiving unit receives the third operation being a long-press operation on the movement change button 13A, the display controller 164 is also configured to change the correspondence between the operation performed by using the control device 10A and the movement amount of the pointer 330.

Therefore, the pointer 330 can be easily moved to an intended position through the operation performed by using the control device 10A.

The control device 10A also includes the six-axis sensor 111 and the magnetic sensor 113 configured to detect at least one of the position, direction, and displacement of the control device 10A.

The display control device 154, based on the detection result of the six-axis sensor 111 and the magnetic sensor 113, detects the operation for displacing the control device 10A as the first operation. Further, the display control device 154 acquires the displacement direction and the displacement amount of the control device 10A as the operation direction and the operation amount of the first operation, and, based on the acquired displacement direction and displacement amount, determines the movement direction and the movement amount of the pointer 330, and thus moves the pointer 330.

As a result, it is possible to change the display position of the pointer 330 through an operation performed by using the control device 10A.

Further, the display control device 154, based on the detection result of the six-axis sensor 111 and the magnetic sensor 113, detects the operation for displacing the control device 10A as the first operation, and acquires the direction of the control device 10A as the operation direction of the first operation. Further, the display control device 154, based on the operation direction of the first operation, decides the movement direction of the pointer 330, and moves the pointer 330 in correspondence to the time for which the first operation is maintained.

As a result, it is possible to change the display position of the pointer 330 through an operation performed by using the control device 10A.

Further, the control device 10A includes a touch sensor 115 configured to operate as the operation detection unit.

The display control device 154 determines whether the second operation is received based on the detection result of a contact operation detected by the touch sensor 115.

Thus, it is possible to detect the second operation through the contact operation detected by the touch sensor 115, and shift to an operation state where the display position of the pointer 330 cannot be moved through the operation performed by using the control device 10A.

Further, the control device 10A may have a proximity sensor configured to detect a proximity operation, as an operation detection unit.

Thus, it is possible to detect the second operation through the proximity operation detected by the proximity sensor, and shift to an operation state where the display position of the pointer 330 cannot be moved through the operation performed by using the control device 10A.

Further, the display controller 154 detects the attitude of the control device 10A based on the position and direction of the control device 10A detected by the six-axis sensor 111 and the magnetic sensor 113. The display controller 154, upon determining that the detected attitude of the control device 10A corresponds to a pre-set attitude pattern, determines that the second operation has been received.

As a result, when the attitude of the control device 10A corresponds to the attitude pattern, it is possible to input the second operation to the HMD 100.

Further, the controller 150 and the inner camera 62 are configured to operate as a sight line detection unit configured to detect a sight line of the user. In a case that the detected sight line is in the predetermined direction, the display control device 154 changes the correspondence between the operation performed by using the control device 10A and the movement amount of the pointer 330.

Therefore, a movement of the pointer 330 to an intended position through the operation performed by using the control device 10A can be easily achieved.

Further, in a case that the operation unit 110 receives an operation for canceling a long-press operation on the movement change button 13A, the display controller 154 magnifies and displays a portion including the pointer 330 in an image displayed by the image display unit 20.

Therefore, the portion including the pointer 330 in the image displayed by the image display unit 20 can be magnified and displayed.

The exemplary embodiment described above is a preferred embodiment of the invention. However, the disclosure is not limited to the exemplary embodiment, and the disclosure can be implemented in various aspects, as long as the aspects fall within the scope of the disclosure.

For example, in the exemplary embodiment described above, a configuration in which the control device 10A is coupled to the image display unit 20 by wire is illustrated, however, the invention is not limited thereto, and the image display unit 20 may be configured to be connected wirelessly to the control device 10A. The wireless communication system in such a case may be a system cited as a communication system supported by the communication unit 119, or may be any other communication system.

Further, some of the functions included in the control device 10A may be provided in the image display unit 20, or the control device 10A may be achieved by a plurality of devices. For example, instead of the control device 10A, a wearable device that can be attached to the body or clothes of the user, or to the personal adornments worn by the user may be used. The wearable device in such a case may be, for example, a watch-like device, a ring-like device, a laser pointer, a mouse, an air mouse, a game controller, a pen-like device, or the like. Further, a smartphone or a tablet terminal may be employed for the control device 10A.

In addition, in the exemplary embodiment described above, a configuration in which the image display unit 20 and the control device 10A were separated, and were connected via a coupling cable 40 was illustrated as an example. The invention is not limited thereto, and the control device 10A and the image display unit 20 may be configured as one part, and worn by the user on the head.

Further, in the exemplary embodiment described above, the configuration in which the user views an external scene through a display unit is not limited to a configuration where the right light-guiding plate 26 and the left light-guiding plate 28 transmit outside light. For example, the configuration is also applicable to a display apparatus configured to display an image in a state where the external scene cannot be viewed. Specifically, the invention can be applied to a display apparatus configured to display images captured by the camera 61, images and CG generated based on the captured images, and movies based on the movie data stored beforehand, or the movie data input from outside. An example of such type of display apparatus includes a so-called closed-type display apparatus through which external scenes cannot be viewed. For example, with a configuration in which composite images created by combining together images of an external scene captured by the camera 61, and display images are displayed by the image display unit 20, even if the image display unit 20 may not transmit outside light, the display apparatus can display the external scenes and images so as to be viewed by the user. Of course, it is also possible to apply the invention to such a so-called video see-through display apparatus.

Further, instead of the image display unit 20, for example, another type of image display unit such as an image display unit to be worn like a cap, for example, may be employed. Such an image display unit may include a display unit configured to display images corresponding to the left eye LE of the user and a display unit configured to display images corresponding to the right eye RE of the user. Further, the head-mounted display apparatus according to the invention may be configured as a head-mounted display to be mounted on a vehicle such as a car or an airplane. The head-mounted display apparatus according to the invention may be also configured as a head-mounted display built into a body protective gear such as a helmet. In such a case, a portion for positioning the device with respect to the body of the user, and a portion positioned with respect to the portion described earlier can be a mounting section of the head-mounted display apparatus.

A configuration in which a virtual image was formed by the half mirrors 261 and 281 on a part of the right light-guiding plate 26 and the left light-guiding plate 28 was illustrated as an optical system configured to guide imaging light to the eyes of the user. The invention is not limited thereto, and an image may be displayed either on the entire surface of the right light-guiding plate 26 and the left light-guiding plate 28, or in a display area having an area that occupies most part of the right light-guiding plate 26 and the left light-guiding plate 28. In such a case, a process for reducing an image may be included in an operation for changing a display position of the image.

In addition, the optical elements of the invention are not limited to the right light-guiding plate 26 and the left light-guiding plate 28 having half mirrors 261 and 281, and any optical components that allow the imaging light to enter the eyes of the user, specifically, diffraction grating, prisms, and holographic display units may be employed.

Such a configuration may be adopted that at least some of the function blocks illustrated in FIG. 4 and FIG. 5 are achieved with hardware, or achieved together with hardware and software, and the invention is not limited to a configuration in which independent hardware resources are arranged as illustrated in the figures. Programs to be executed by the controller 150 may be stored in a non-volatile storage unit 123 or in another storage device (not illustrated) in the control device 10A. Such a configuration may be adopted that programs stored in external devices may be acquired via the communication unit 119 and the external connector 184 to be executed. Among configurations formed in the control device 10A, the operation unit 110 may be formed as the user interface (UI). A duplicate of a configuration formed in the control device 10A may be formed in the image display unit 20. For example, a processor similar to the main processor 140 may be arranged in the image display unit 20, or the main processor 140 included in the control device 10A and the processor of the image display unit 20 may be configured to perform separate functions.

In a case where the method of controlling the head-mounted display apparatus according to the invention is to be achieved by using a computer including the display device, it is also possible to configure the invention according to illustrative embodiments of a program executed by the computer for achieving the above control method, a recording medium for recording the programs in a format read by the computer, or a transmission medium for transmitting the program. Examples of the recording medium include magnetic and optical recording medium or a semiconductor memory device. A specific example includes a portable or a stationary recording medium such as a flexible disk, a hard disk drive (HDD), a compact disk read only memory (CD-ROM), a digital versatile disk (DVD), a Blu-ray (trade name), a Disc, a magneto-optical disk, a flash memory, and a card-type storage medium. The recording medium may be also a non-volatile storage device such as a random access memory (RAM), a read only memory (ROM), and an HDD, which are internal storage devices included in the image display apparatus.

The entire disclosure of Japanese Patent Application No. 2018-008629, filed Jan. 23, 2018 is expressly incorporated by reference herein.

What is claimed is:

1. A head-mounted display apparatus comprising:
a display unit to be worn by a user on a head and configured to display an image;
a detection unit configured to detect a first operation performed by using an operation device, the operation device having a housing configured to be hand-held by the user, the detection unit being, located within the housing of the operation device;
a receiving unit configured to receive a second operation different from the first operation; and
a display controller configured to display, on the display unit, an operation image to be operated by the operation device, and to move the operation image, based on the first operation detected by the detection unit, wherein
in a case that the receiving unit receives the second operation, the display controller shifts to an operation state where a display position of the operation image is not moved by the first operation, and
when an operation of the operation image is disabled, the display controller associates the display position of the operation image with coordinates of a three-dimensional space, and fixes the display position at the associated position.

2. The head-mounted display apparatus according to claim 1, wherein
in a case that the receiving unit receives a third operation different from the second operation, the display controller changes a correspondence between the first operation and a movement amount of the operation image.

3. The head-mounted display apparatus according to claim 1, wherein
the operation device includes a sensor configured to detect at least one of a position, a direction, and a displacement of the operation device,
the detection unit detects an operation for displacing the operation device as the first operation, based on a detection result of the sensor, and acquires a displacement direction and a displacement amount of the operation device as an operation direction and an operation amount of the first operation, and
the display controller determines a movement direction and a movement amount of the operation image, based on an acquired displacement direction and displacement amount, and moves the operation image.

4. The head-mounted display apparatus according to claim 1, wherein
the operation device includes a sensor configured to detect at least one of a position, a direction, and a displacement of the operation device,
the detection unit detects an operation for displacing the operation device as the first operation, based on a detection result of the sensor, and acquires a direction of the operation device as an operation direction of the first operation, and
the display controller determines a movement direction of the operation image, based on the operation direction of the first operation, and moves the operation image in correspondence to a time for which the first operation is maintained.

5. The head-mounted display apparatus according to claim 1, wherein the operation device includes an operation detection unit, and
whether the receiving unit has received the second operation is determined based on a detection result of the operation detection unit.

6. The head-mounted display apparatus according to claim 5, wherein
the operation detection unit is a sensor configured to detect a contact operation.

7. The head-mounted display apparatus according to claim 5, wherein
the operation detection unit is a sensor configured to detect a proximity operation.

8. The head-mounted display apparatus according to claim 1, wherein
the operation device includes a sensor configured to detect at least one of a position, a direction, and a displacement of the operation device, and
the receiving unit detects an attitude of the operation device, based on a position and a direction of the operation device detected by the sensor, and in a case where it is determined that a detected attitude of the operation device is an attitude corresponding to a pre-set attitude pattern, the receiving unit determines that the second operation has been received.

9. The head-mounted display apparatus according to claim 1, wherein
the display unit includes a sight line detection unit configured to detect a sight line of the user, and
in a case that a sight line detected by the sight line detection unit is in a predetermined direction, the receiving unit changes a correspondence between the first operation and a movement amount of the operation image.

10. The head-mounted display apparatus according to claim 1, wherein
in a case that the receiving unit receives a fourth operation different from the second operation, the display controller magnifies and displays a portion including the operation image in the image displayed by the display unit.

11. The head-mounted display apparatus according to claim 1, wherein the second operation is performed on an input interface on the operation device.

12. A method of controlling a head-mounted display apparatus including a display unit to be worn by a user on a head and configured to display an image, the method comprising:
detecting a first operation performed by using a detection unit that is a part of an operation device, the operation device having a housing configured to be hand-held by the user, the detection unit being located within the housing of the operation device;
receiving a second operation different from the first operation;
displaying, on the display unit, an operation image to be operated by the operation device, and moving the operation image, based on the first operation detected;
in a case that the receiving unit receives the second operation, shifting to an operation state where a display position of the operation image is not moved by the first operation; and
when an operation of the operation image is disabled, associating the display position of the operation image with coordinates of a three-dimensional space, and fixing the display position at the associated position.

13. The method according to claim 12, wherein the second operation is performed on an input interface on the operation device.

\* \* \* \* \*